United States Patent
Tsuchiya

(10) Patent No.: US 12,422,814 B2
(45) Date of Patent: Sep. 23, 2025

(54) WORKPIECE MACHINING METHOD AND WORKPIECE MACHINING DEVICE

(71) Applicant: SHIBAURA MACHINE CO., LTD., Tokyo (JP)

(72) Inventor: Koji Tsuchiya, Shizuoka (JP)

(73) Assignee: SHIBAURA MACHINE CO., LTD., Tokyo (JP)

( * ) Notice: Subject to any disclaimer, the term of this patent is extended or adjusted under 35 U.S.C. 154(b) by 745 days.

(21) Appl. No.: 17/810,787

(22) Filed: Jul. 5, 2022

(65) Prior Publication Data
US 2022/0334549 A1  Oct. 20, 2022

Related U.S. Application Data

(63) Continuation of application No. PCT/JP2020/047462, filed on Dec. 18, 2020.

(30) Foreign Application Priority Data

Jan. 8, 2020  (JP) .................................. 2020-001237

(51) Int. Cl.
  G05B 19/402  (2006.01)
  B23Q 15/12  (2006.01)
  G05B 19/19  (2006.01)

(52) U.S. Cl.
  CPC .......... *G05B 19/402* (2013.01); *B23Q 15/12* (2013.01); *G05B 19/19* (2013.01); *G05B 2219/37506* (2013.01)

(58) Field of Classification Search
  CPC .................. G05B 19/402; G05B 19/19; G05B 2219/37506; B23Q 15/12
  See application file for complete search history.

(56) References Cited

U.S. PATENT DOCUMENTS

| 5,255,199 A | 10/1993 | Barkman et al. |
| 2014/0114458 A1* | 4/2014 | Miyata .................... G06F 30/17 |
| | | 700/98 |

(Continued)

FOREIGN PATENT DOCUMENTS

| CN | 101866163 | 10/2010 |
| CN | 102581705 | 7/2012 |

(Continued)

*Primary Examiner* — Robert E Fennema
*Assistant Examiner* — Yvonne Trang Follansbee
(74) *Attorney, Agent, or Firm* — DLA PIPER LLP (US)

(57) ABSTRACT

A machining device includes: a positional deviation detection unit configured to calculate a correction value for correcting a positional deviation between an ideal contour line and an actual contour line in each of a plurality of angular directions based on a center of a hemispherical shape of a tool; a distance effect coefficient calculation unit configured to calculate a first distance effect coefficient indicating a degree of influence of the positional deviation when machining a second machining point, according to a distance between the tool and the second machining point in a case where a machining point machined by the tool transitions from one-point machining including a first machining point in the workpiece to two-point machining including the first machining point and the second machining point; and a positional deviation correction unit configured to correct the positional deviation of the tool.

7 Claims, 30 Drawing Sheets

(56) References Cited

U.S. PATENT DOCUMENTS

| | | | | |
|---|---|---|---|---|
| 2018/0299859 | A1* | 10/2018 | Kaneko | G05B 19/41 |
| 2021/0063994 | A1* | 3/2021 | Saitou | G05B 19/404 |
| 2021/0063995 | A1 | 3/2021 | Tsuchiya | |
| 2021/0109502 | A1* | 4/2021 | Yasukochi | G05B 19/23 |

FOREIGN PATENT DOCUMENTS

| | | |
|---|---|---|
| CN | 103218475 | 7/2013 |
| JP | S63-233403 | 9/1988 |
| WO | WO 2019/221005 | 11/2019 |

* cited by examiner

FIG. 9A (1)NORMAL VECTOR OF MACHINING POINT Tt1 × AMOUNT OF CORRECTION OF MACHINING POINT 1
(2)VOIDANCE VECTOR OF MACHINING POINT Tt1 × AMOUNT OF CORRECTION OF MACHINING POINT 1 × TAN θ

FIG. 9B

|MACHINING POINT Tt1|MACHINING POINT Tt1|
|AMOUNT OF CORRECTION|AMOUNT OF AVOIDANCE|

$$\left.\begin{array}{l}X[Px + \overbrace{[i1\#50B}^{r1} + \overbrace{i2\#50A*Ed}^{r2} + \overbrace{i11**\#50B*\tan\theta*Ed}^{r3} + \overbrace{i22**\#50A*\tan\theta*Ed\,]]}^{r4} \\ Y[Py + [j1\#50B + j2\#50A*Ed + j11**\#50B*\tan\theta*Ed + j22**\#50A*\tan\theta*Ed\,]] \\ Z[Pz + [k1\#50B + k2\#50A*Ed + k11**\#50B*\tan\theta*Ed + k22**\#50A*\tan\theta*Ed\,]]\end{array}\right\}\quad\cdots(3)$$

FIG. 19

WHEN Da = 0.01  Ed = 0.4096

$$\left.\begin{array}{l} X[Px+[i1*\#50B + i2*\#50A *0.4096 *0.4096 + i11*\#50B*\tan\theta * 0.4096 + i22*\#50A*\tan\theta * 0.4096]] \\ Y[Py+[j1*\#50B +j2*\#50A *0.4096 *0.4096 + j11*\#50B*\tan\theta * 0.4096 + j22*\#50A*\tan\theta * 0.4096]] \\ Z[Pz+[k1*\#50B +k2*\#50A *0.4096 *0.4096 + k11*\#50B*\tan\theta * 0.4096 + k22*\#50A*\tan\theta * 0.4096]] \end{array}\right\} \cdots(4)$$

FIG. 29

$$\left.\begin{array}{l}V_{cB3x} = i3* IP_{S3c12} *(-1)*Ed_3 = -i3* IP_{S3c12}*Ed_3 \\ V_{cB3y} = j3* IP_{S3c12} *(-1)*Ed_3 = -j3* IP_{S3c12}*Ed_3 \\ V_{cB3z} = k3* IP_{S3c12} *(-1)*Ed_3 = -k3* IP_{S3c12}*Ed_3 \end{array}\right\} \cdots\cdots(9)$$

FIG. 30

$$\left.\begin{array}{l}V_{cS3x} = i4 *|V_{cS3}|*Sign(V_{cS3}) = i4 * |V_{c3}|*Sign(V_{cS3})/\cos\theta_2 \\ \quad = i4 * (V_{c3x} * i3 + V_{c3y} * j3 + V_{c3z} * k3) /\cos\theta_2 \\ V_{cS3y} = j4 *|V_{cS3}|*Sign(V_{cS3}) = j4 * |V_{c3}|*Sign(V_{cS3})/\cos\theta_2 \\ \quad = j4 * (V_{c3x} * i3 + V_{c3y} * j3 + V_{c3z} * k3) /\cos\theta_2 \\ V_{cS3z} = k4 *|V_{cS3}|*Sign(V_{cS3}) = k4 * |V_{c3}|*Sign(V_{cS3})/\cos\theta_2 \\ \quad = k4 * (V_{c3x} * i3 + V_{c3y} * j3 + V_{c3z} * k3) /\cos\theta_2 \end{array}\right\} \cdots\cdots(12)$$

FIG. 31

$$\begin{aligned}
V_{c3x}*i3 + V_{c3y}*j3 + V_{c3z}*k3 &= (V_{cA3x} + V_{cB3x})*i3 + (V_{cA3y} + V_{cB3y})*j3 + (V_{cA3z} + V_{cB3z})*k3 \\
&= (i3**50C*Ed_3 - i3* IP_{S3c12}*Ed_3)*i3 + (j3**50C*Ed_3 - j3* IP_{S3c12}*Ed_3)*j3 + (k3**50C*Ed_3 - k3* IP_{S3c12}*Ed_3)*k3 \\
&= (\#50C - IP_{S3c12})*i3^2*Ed_3 + (\#50C - IP_{S3c12})*j3^2*Ed_3 + (\#50C - IP_{S3c12})*k3^2*Ed_3 \\
&= (\#50C - IP_{S3c12})* Ed_3 *(i3^2 + j3^2 + k3^2)
\end{aligned} \quad \cdots(13)$$

FIG. 32

$$\left.\begin{array}{l}IP_{S3c12} = i3*V_{c12x} + j3*V_{c12y} + k3*V_{c12z}\\ = i3*(i1*\#50B\ +i2*\#50A*Ed_1\ +i11*\#50B*\tan\theta_1*Ed_1\ +i22*\#50A*\tan\theta_1*Ed_1)\\ +j3*(j1*\#50B\ +j2*\#50A*Ed_1\ +j11*\#50B*\tan\theta_1*Ed_1\ +j22*\#50A*\tan\theta_1*Ed_1)\\ +k3*(k1*\#50B\ +k2*\#50A*Ed_1\ +k11*\#50B*\tan\theta_1*Ed_1\ +k22*\#50A*\tan\theta_1*Ed_1)\end{array}\right\}\ \cdots(14)$$

FIG. 33

INSIDE BRACKETS OF X[$P_x + V_{c12x} + V_{cS3x}$]
$P_x + V_{c12x} + V_{cS3x} = P_x +$
$i1*\#50B + i2*\#50A*Ed_1 + i11*\#50B*\tan\theta_1*Ed_1 + i22*\#50A*\tan\theta_1*Ed_1$
$+ i4 * (\#50C - IP_{S3c12}) * Ed_3[i3^2 + j3^2 + k3^2]/\cos\theta_2$ ......(15)

INSIDE BRACKETS OF Y[$P_y + V_{c12y} + V_{cS3y}$]
$P_y + V_{c12y} + V_{cS3y} = P_y +$
$j1*\#50B + j2*\#50A*Ed_1 + j11*\#50B*\tan\theta_1*Ed_1 + j22*\#50A*\tan\theta_1*Ed_1$
$+ j4 * (\#50C - IP_{S3c12}) * Ed_3[i3^2 + j3^2 + k3^2]/\cos\theta_2$ ......(16)

INSIDE BRACKETS OF Z[$P_z + V_{c12z} + V_{cS3z}$]
$P_z + V_{c12z} + V_{cS3z} = P_z +$
$k1*\#50B + k2*\#50A*Ed_1 + k11*\#50B*\tan\theta_1*Ed_1 + k22*\#50A*\tan\theta_1*Ed_1$
$+ k4 * (\#50C - IP_{S3c12}) * Ed_3[i3^2 + j3^2 + k3^2]/\cos\theta_2$ ......(17)

HERE, $IP_{S3c12} = i3*V_{c12x} + j3*V_{c12y} + k3*V_{c12z}$
$= i3*(i1*\#50B + i2*\#50A*Ed_1 + i11*\#50B*\tan\theta_1*Ed_1 + i22*\#50A*\tan\theta_1*Ed_1)$
$+ j3*(j1*\#50B + j2*\#50A*Ed_1 + j11*\#50B*\tan\theta_1*Ed_1 + j22*\#50A*\tan\theta_1*Ed_1)$
$+ k3*(k1*\#50B + k2*\#50A*Ed_1 + k11*\#50B*\tan\theta_1*Ed_1 + k22*\#50A*\tan\theta_1*Ed_1)$ ......(18)

FIG. 34

$$X[P_x+V_{c12x}+V_{cS3x}] = X[P_x + \alpha *\#50A + \beta *\#50B + \gamma *\#50C] \cdots\cdots(19)$$

WORKPIECE MACHINING METHOD AND WORKPIECE MACHINING DEVICE

CROSS-REFERENCE TO RELATED APPLICATIONS

The present application is a continuation of International Application No. PCT/JP2020/047462, filed on Dec. 18, 2020, and based upon and claims the benefit of priority from Japanese Patent Application No. 2020-001237, filed on Jan. 8, 2020, the entire contents of which are incorporated herein by reference.

FIELD

Embodiments described herein relate generally to a workpiece machining method and a workpiece machining device.

BACKGROUND

Conventionally, a workpiece machining device has been employed in which an end mill (a tool having a hemispherical tip, and hereinafter referred to simply as "tool") is positioned relative to a workpiece (a material to be machined) by using an NC program, and the tool rotates to perform machining of the workpiece.

In such a machining device, a tool is fixed to a tool holding unit such as a spindle by means of chucking, and positioned relative to a workpiece to perform machining of the workpiece. Accordingly, when the tool is fixed to the tool holding unit, a positional deviation may occur due to defective chucking or the like. In addition, an initial shape error may occur in the tool. In such cases, it is not possible to move a tool to an accurate cutting position with respect to the workpiece, thereby causing a problem that machining cannot be performed with high accuracy.

Further, PTL 1 (JP S63-233403 A) discloses that when a workpiece is machined using a tool, the position of the tool (end mill) is corrected in consideration of deterioration of the tool due to wear. That is, PTL 1 discloses that an error of a cutting surface is prevented by calculating a shape error by laser-scanning the tool shape which changes as machining of the workpiece using the tool proceeds, calculating an amount of correction of the tool position based on the calculated shape error, and correcting the tool position.

However, the technique disclosed in PTL 1 refers to a correction for the deterioration of the tool due to wear, and does not refer to a correction for a shape error of the tool or a correction of a positioning error thereof. Further, although PTL 1 discloses that corrections are performed for errors when the tool touches one point of the workpiece and machines the workpiece, PTL 1 does not disclose that corrections are performed for errors when the tool touches a plurality of points (for example, two points) and machines the workpiece.

BRIEF DESCRIPTION OF THE DRAWINGS

FIG. 7 is a diagram illustrating an expression for coordinates of the machining positions using the tool, and illustrating the coordinates of the machining positions which have already been corrected caused by contour errors.

FIGS. 8A to 8D are explanatory diagrams illustrating the machining position of the workpiece using the tool when transitioning from one-point machining to two-point machining, wherein FIG. 8A illustrates a state where the tool is approaching the machining point Tt1, FIG. 8B illustrates a biting state generated when the tool reaches the machining point Tt1, FIG. 8C illustrates a correction state for avoiding the bite, and FIG. 8D illustrates a specific correction state.

FIGS. 9A and 9B are diagrams illustrating the position coordinates of the tool when the correction illustrated in FIG. 8D is performed.

FIG. 18 is a diagram illustrating an expression for coordinates in which the machining position of the tool is corrected using the distance effect coefficient.

FIG. 19 illustrates an expression obtained by substituting a specific numerical value for the distance effect coefficient into the expression illustrated in FIG. 18.

FIG. 29 is a diagram illustrating an expression for a correction vector for avoiding biting into the third machining surface caused by correction procedures for the first machining surface and the second machining surface.

FIG. 30 is a diagram illustrating an expression for a correction vector for the third machining surface.

FIG. 31 is a diagram illustrating an expression in which the terms illustrated in Expression (12) of FIG. 30 have been partially expanded.

FIG. 32 is a diagram illustrating an expression in which the terms illustrated in Expression (13) of FIG. 31 have been partially expanded.

FIG. 33 is a diagram illustrating an expression obtained by expanding the X, Y and Z coordinates of a final correction vector.

FIG. 34 is a diagram illustrating an expression for summarizing the final correction vector.

DETAILED DESCRIPTION

A workpiece machining method and a workpiece machining device according to the embodiments will be described below with reference to the drawings.

Description of First Embodiment

Figure 1:
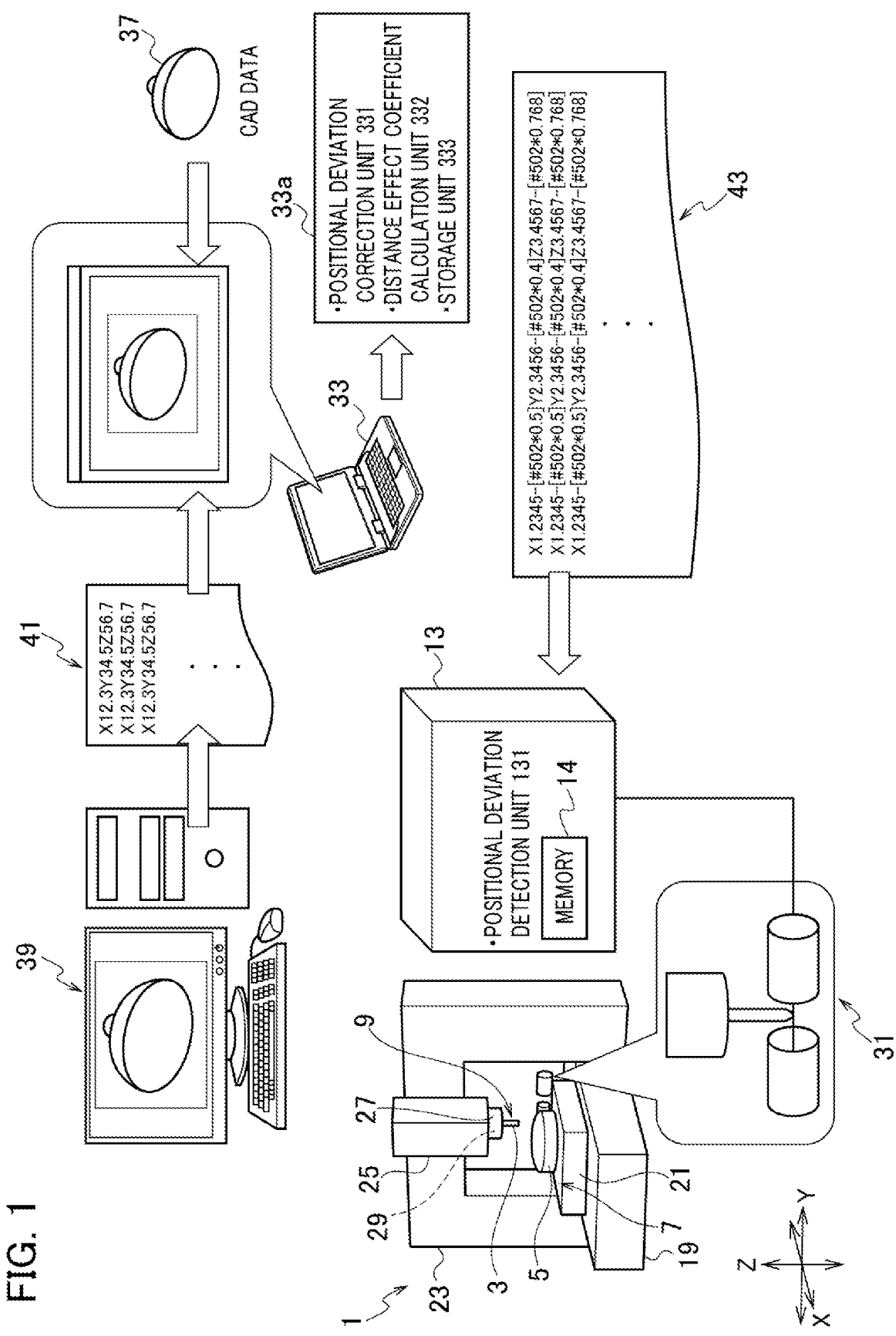
FIG. 1 is a block diagram schematically illustrating a configuration of a workpiece machining device according to an embodiment.

FIG. 1 is an explanatory diagram schematically illustrating a configuration of a workpiece machining device 1 (hereinafter simply referred to as "machining device 1") in which a machining method according to the first embodiment is employed. As illustrated in FIG. 1, the machining device 1 includes a bed 19 serving as a base, a table 21 provided on the upper surface of the bed 19, a column 23 which is disposed from the sides of the bed 19 to straddle the bed 19 and formed into an inverted U-shape in a front view, and a main shaft support 25 disposed near the upper center of the column 23.

In the following description, a direction to be set on the upper surface of the bed 19 is defined as an X-axis direction (longitudinal direction), a direction orthogonal to the X-axis direction on the upper surface of the bed 19 is defined as a Y-axis direction (lateral direction), and a direction orthogonal to the upper surface of the bed 19 (that is, a normal line direction) is defined as a Z-axis direction. The X, Y, and Z axes are an orthogonal coordinate system.

The table 21 includes a workpiece holding unit 7. The workpiece holding unit 7 fixes the workpiece 5 to be machined by the machining device 1. The table 21 is supported on the bed 19 via a linear guide bearing (not illustrated), and is movable in the X-axis direction relative to the bed 19 by an actuator (not illustrated) such as a linear motor. That is, the workpiece 5 can be relatively positioned to a desired position on the X-axis on the bed 19 by controlling the table 21.

The column 23 is formed integrally with the bed 19. The main shaft support 25 formed into a casing shape is provided in the vicinity of the upper center of the column 23. A main shaft housing 27 is provided on the lower surface of the main shaft support 25.

A spindle 29 for fixing and rotating a ball end mill 3 (end mill, and hereinafter referred to as "tool") having a hemispherical lower end is provided at a suitable position on the lower surface of the main shaft housing 27.

The spindle 29 is provided with a tool holding unit 9, and the tool holding unit 9 enables the tool 3 to be attached and detached. In other words, a desired tool can be attached to the tool holding unit 9 according to the mode for machining the workpiece 5. The tool 3 is positioned to a desired position in the Z-axis direction of the spindle 29. The spindle 29 is also movable in the Z-axis direction. Accordingly, the tool 3 can be positioned in the Z-axis direction by controlling the spindle 29.

The main shaft housing 27 is supported by the main shaft support 25 via a linear guide bearing (not illustrated). Accordingly, the tool 3 can be moved in the Y-axis direction by an actuator (not illustrated) such as a linear motor. That is, the tool 3 can be positioned to a desired position on the Y-axis by controlling the main shaft housing 27.

Thus, the three-dimensional relative positions of the workpiece 5 and the tool 3 can be set by controlling the movement of the table 21, the main shaft housing 27, and the spindle 29. That is, the tool 3 abuts a desired machining part of the workpiece 5, thereby making it possible to perform machining of the workpiece 5.

Figure 2:
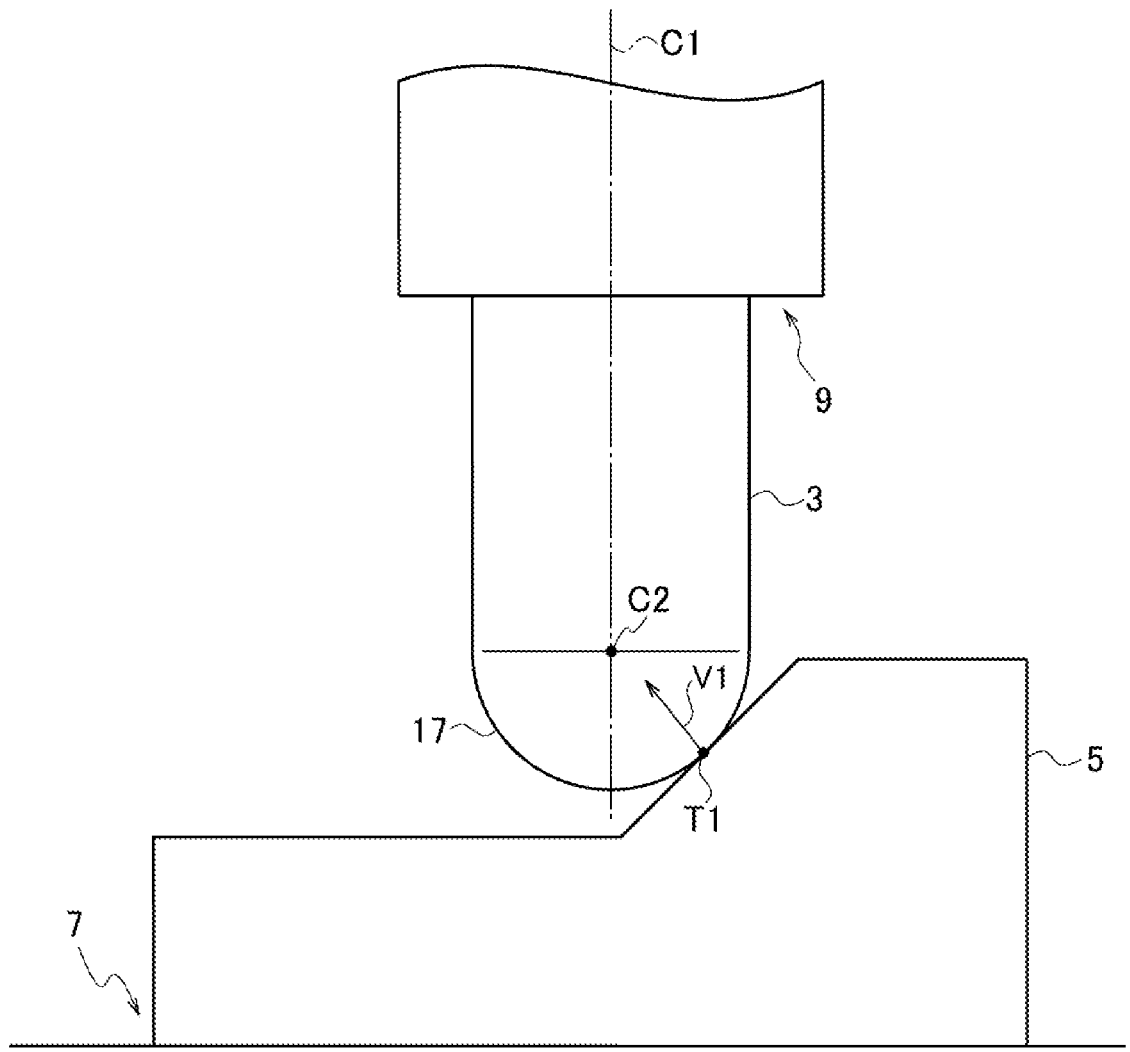
FIG. 2 is an explanatory diagram illustrating a workpiece machined by a tool (ball end mill).

FIG. 2 is an explanatory diagram schematically illustrating a state in which the tool 3 is in contact with the workpiece 5 at the time of machining. As illustrated in FIG. 2, the tool 3 has a shape in which a side view when the tool 3 rotates is linearly symmetric with the center line C1 (center axis) as a rotation axis.

The tool 3 is provided with a cutting edge unit (not illustrated) on an outer periphery of a tip 17, which makes it possible to perform machining of the workpiece 5 using the cutting edge unit. The center of the hemispherical shape of the end mill 3 is defined as C2.

The tool 3 has the upper end (upper end in FIG. 2) fixed to the tool holding unit 9 by means of chucking. The tool 3 held by the tool holding unit 9 rotates about the center line C1 in the Z-axis direction to perform machining of the workpiece 5 with the cutting edge unit.

As illustrated in FIG. 1, the machining device 1 includes a control unit 13 for comprehensively controlling the entire machining device 1 including movement control of the table 21, the main shaft housing 27, and the spindle 29. The control unit 13 includes a positional deviation detection unit 131, and a memory 14 for storing various data.

The control unit 13 controls the movement of the table 21 to which the workpiece is fixed, and the movement of the spindle 29 to which the tool 3 is fixed, based on an NC program. In addition, the control unit 13 controls the rotation of the tool 3. The control unit 13 may be configured as an integrated computer including a central processing unit (CPU), and storage means such as a RAM, a ROM, and a hard disk, for example.

The NC program is set by a CAM 39 based on CAD data 37 of the workpiece 5. The machining path 41 when moving the tool 3 relative to the workpiece 5, and three-dimensional coordinates of the machining path 41 are set in the NC program. The NC program set by the CAM 39 is transmitted to a computer 33.

As illustrated FIG. 1, the machining device 1 includes a tool shape measuring device 31 for measuring the shape of the tool 3. The tool shape measuring device 31 is a laser measuring instrument, for example, and measures the shape of the tool 3 by radiating a laser beam from the side-surface direction of the tool 3 and receiving the radiated laser beam. The positional deviation detection unit 131 calculates a contour line (referred to as "actual contour line P3") of the tool 3 based on the shape of the tool 3 measured by the tool shape measuring device 31.

That is, the positional deviation detection unit 131 detects a deviation amount between an actual contour line, which is a contour line of the tool 3, and an ideal contour line (referred to as "ideal contour line P1"), which is a contour line of the tool 3 having an ideal shape, when the tool 3 is held by the tool holding unit 9. Specifically, a correction value for a contour error for correcting a positional deviation between the ideal contour line P1 and the actual contour line P3 is calculated. In addition, a correction value is calculated in each of a plurality of angular directions based on the center of the hemispherical shape of the tip of the tool 3. The calculated correction values are stored in the memory 14.

The computer 33 includes a calculation unit 33a. The calculation unit 33a corrects the machining path 41 included in the NC program when machining of the workpiece 5 is performed by the tool 3. That is, the calculation unit 33a of the computer 33 acquires the NC program including the machining path 41 from the CAM 39, and corrects three-dimensional coordinates of the machining path 41 using the correction values calculated by processing described later. The calculation unit 33a of the computer 33 corrects the NC program based on the correction values. Thereafter, machining of the workpiece 5 is performed by the tool 3 using the corrected machining path 43. To be more specific, the calculation unit 33a includes a positional deviation correction unit 331, a distance effect coefficient calculation unit 332, and a storage unit 333.

The distance effect coefficient calculation unit 332 calculates a distance effect coefficient indicating the degree of influence of a positional deviation when machining a second machining point, according to a distance between the tool 3 and the second machining point in a case where a machining point machined by the tool 3 transitions from one-point machining including a first machining point on a first machining surface of the workpiece 5 to two-point machining including the first machining point and the second machining point, which is on a second machining surface different from the first machining surface. The distance effect coefficient calculation unit 332 stores the calculated distance effect coefficients in the storage unit 333.

The positional deviation correction unit 331 corrects the NC program based on the correction values for contour errors stored in the memory 14 of the control unit 13, and the distance effect coefficients stored in the storage unit 333 of the calculation unit 33a. The positional deviation correction unit 331 corrects a positional deviation of the first machining point based on a correction value for a contour error when performing one-point machining using the tool 3, and corrects a positional deviation based on the correction value for the contour error at the first machining point and the distance effect coefficient when the distance between the tool 3 and the second machining point approaches within a predetermined distance in a case where the machining point machined by the tool 3 transitions from one-point machining to two-point machining. Thus, the NC program is corrected according to the correction values for contour errors and the distance coefficients.

Next, a description will be given regarding a process for correcting a positional deviation between the ideal contour line P1 of the tool 3 and the actual contour line P3 of the tool 3.

When the workpiece 5 is machined using the tool 3, a positional deviation occurs when the tool 3 is fixed to the spindle 29 as described above and there is also a shape error in the tool 3. Accordingly, an error (referred to as "contour error") occurs between the ideal contour line P1 and the actual contour line P3. The presence of this contour error causes an error in the machining position of the workpiece 5, thereby reducing machining accuracy. In the first embodiment, a process for correcting the contour error occurring in the tool 3 is performed. A detailed description will be given below.

Figure 3A:
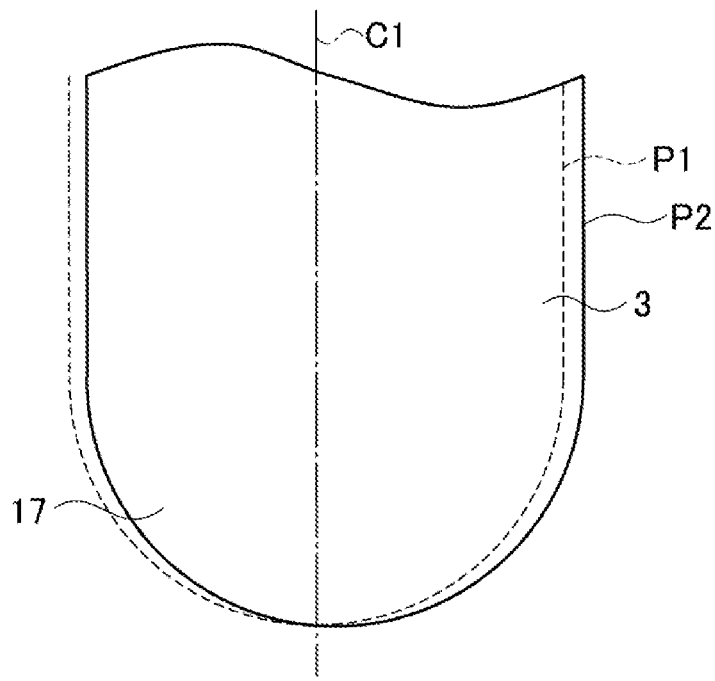
FIG. 3A is an explanatory diagram illustrating a contour error between an actual contour line and an ideal contour line in the tool when stationary.
Figure 3B:
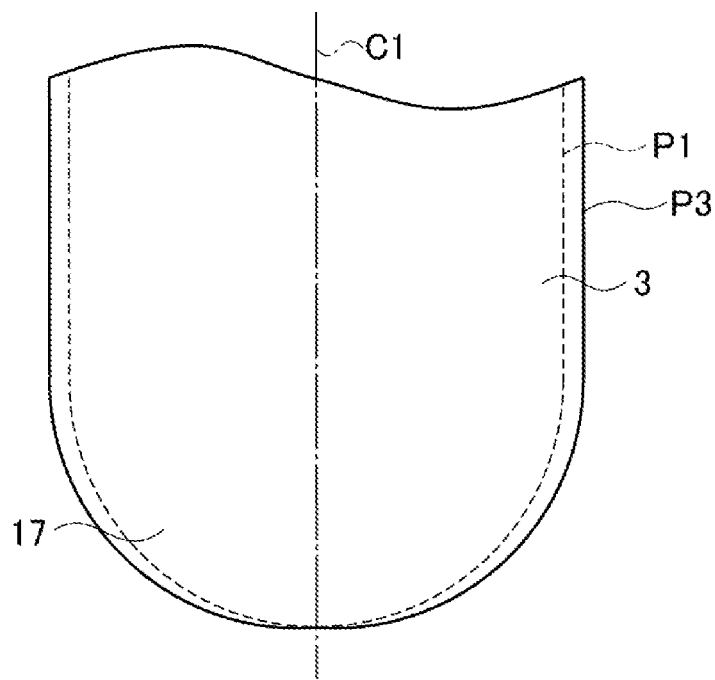
FIG. 3B is an explanatory diagram illustrating a contour error between the actual contour line and the ideal contour line when the tool rotates.

FIGS. 3A and 3B are explanatory diagrams illustrating the outline of the tool 3. In FIG. 3A, the curve (symbol P1) indicated by the broken line is the outer shape of the stationary tool 3 having an ideal shape, and the curve (symbol P2) indicated by a solid line is the outer shape of the tool 3 having a shape error. The outer shape of the tool 3 having an ideal shape is defined as an ideal contour line P1, and the outer shape of the tool 3 having a shape error is defined as a contour line P2. As illustrated in FIG. 3A, the contour line P2 is positioned so as to be slightly biased to the right of the center line C1 with respect to the ideal contour line P1. In FIG. 3A, a deviation amount between the ideal contour line P1 and the contour line P2 is exaggerated.

In FIG. 3B, the curve (symbol P1) indicated by the broken line indicates a contour line (coinciding with the P1 in FIG. 3A) when the tool 3 having an ideal shape rotates about the center line C1, and the curve (symbol P3) indicated by a solid line indicates a contour line (referred to as the actual contour line P3) when the tool 3 having a shape error rotates about the center line C1. Since the contour line P2 illustrated in FIG. 3A is biased with respect to the ideal contour line P1, the actual contour line P3 has a radius greater than the ideal contour line P1. FIG. 3B is merely an example, and the actual contour line P3 may be smaller than the ideal contour line P1 in some cases.

In the first embodiment, a contour error, which is the difference between the ideal contour line P1 and the actual contour line P3, is calculated, and the data of the calculated contour error is stored in the memory 14 illustrated in FIG. 1 as correction values. This process is performed by the positional deviation detection unit 131 illustrated in FIG. 1.

The method of calculating the contour error will be described below.

[Calculation of Contour Error]

Figure 4:
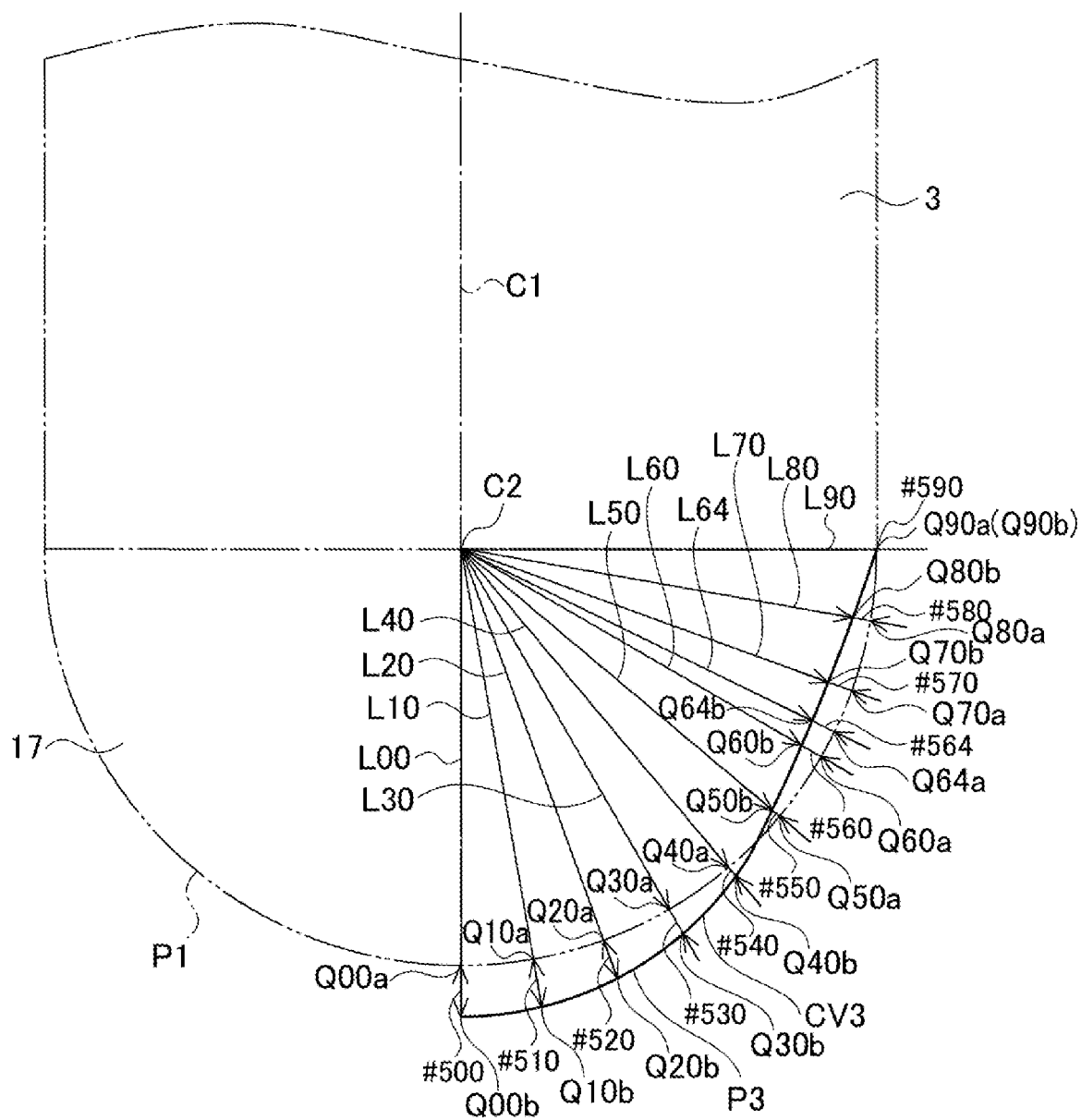
FIG. 4 is an explanatory diagram illustrating a contour error for each angle occurring in the tool.

As illustrated in FIG. 2, since the workpiece 5 is machined by the tip 17 of the tool 3, the contour error of the tool 3 can be obtained by a ¼ arc of the tip 17 (that is, the angle within the range of 90 degrees) as illustrated in FIG. 4.

Specifically, the difference between the arc (arc of a ¼ circle) of the ideal contour line P1 and the arc (arc of a ¼ circle) of the actual contour line P3 is calculated as a contour error with the center line C1 in the ideal contour line P1 as a center. The contour error is stored in the memory 14 illustrated in FIG. 1.

As an initial process for performing the process of calculating the correction values, the shape of the tool 3 is measured using the tool shape measuring device 31 (see FIG. 1). Here, an example will be described in which a laser measuring instrument is used as the tool shape measuring device 31.

The laser measuring instrument measures the shape of the tool 3 by irradiating the tool 3 with a laser from the side-surface direction of the tool 3 and receiving the radiated laser. As a result, the contour line P2 of the tool 3 is obtained as illustrated in FIG. 3A, and thus the actual contour line P3 illustrated in FIG. 3B can be obtained. The ideal contour line P1 can be read from the memory 14 of the control unit 13.

The positional correction of the tool 3 is made based on a unit normal vector V1 at a machining point T1 (refer to FIG. 2, details of which will be described later) machined by the tool 3, and a contour error of the tool 3. Thus, the three-dimensional position of the tool 3 can be corrected in at least one of the X-axis direction, the Y-axis direction, and the Z-axis direction. The directions of the X, Y, and Z axes are determined according to the unit normal vector V1.

FIG. 4 is an explanatory diagram illustrating the relationship between the angles of the arc (0 to 90 degrees) of the tool 3 and the correction values for correcting the shape error. FIG. 4 illustrates the ideal contour line P1 and the actual contour line P3 in the arc of the tool 3. In FIG. 4, the vertical direction is set at an angle of 0 degree, and the horizontal direction is set at an angle of 90 degrees. As an example, FIG. 4 illustrates a shape in which the actual contour line P3 protrudes outward of the ideal contour line P1 in a range of 0 to 45 degrees based on the arc center line C1, and a shape in which the actual contour line P3 is more recessed than the ideal contour line P1 in a range of 45 degrees to 90 degrees.

As illustrated in FIG. 4, the ten straight lines L00 to L90 extending from the center line C1 in the arc toward the outer shape of the 90-degree arc of the tool 3 are set at 10-degree intervals. The straight lines are set in angular directions at 10-degree intervals. The intersection angle between the center line C1 of the tool 3 and the straight line L00 is 0 degrees. That is, the straight line L00 and the center line C1 are parallel to each other (collinear).

The intersection angle between the center line C1 and the straight line L10 is 10 degrees. Similarly, the intersection angles between the center line C1 and the lines L20 to L90 are from 20 degrees to 90 degrees. That is, the direction parallel to the center line C1 is 0 degrees, the direction orthogonal to the center line C1 is 90 degrees, and straight lines are set for each angular direction of 10 degrees.

Here, the intersection point between the straight line L00 and the ideal contour line P1 is defined as the intersection point Q00$a$. Similarly, the intersection points between the straight lines L10, L20, . . . , and, L90 and the ideal contour line P1 are defined as the intersections Q10$a$, Q20$a$, . . . , and, Q90$a$, respectively. Meanwhile, the intersection points between the straight lines L00, L10, L20, . . . , and L90 and the actual contour line P3 are defined as the intersections Q00$b$, Q10$b$, Q20$b$, . . . , and, Q90$b$, respectively. Accordingly, since the distance (that is, the difference) between the two intersection points in each straight line is a shape error, this difference value is set as a "correction value". For example, "Q10$b$−Q10$a$" is set as the correction value for the straight line L10.

Thereafter, the correction values for the respective angular directions are stored in the memory 14 of the control unit 13 illustrated in FIG. 1 as reference signs #500, #510, . . . , and, #590. Specifically, "#500=Q00$b$−Q00$a$" is set, "#510=Q10$b$−Q10$a$" is set, and correction values thereafter up to "#590=Q90$b$−Q90$a$" are also set in the same manner.

Although FIG. 4 illustrates an example in which the correction values are calculated for the respective straight lines L00, L10, . . . , and, L90 at intervals of 10 degrees in order to avoid complication in the figure, in reality, the correction values are set to finer angle intervals (for example, 1 degree). Accordingly, correction values for respective angle intervals of 1 degree are stored in the memory 14 as reference signs #500, #501, #502, . . . , #589, and #590.

That is, the straight lines L00 to L90 are drawn from the center line C1 of the ideal contour line P1 illustrated in FIG. 4 at each angle of 1 degree, and the correction values are calculated on the respective straight lines. The calculated correction values are stored in the memory 14 as the reference signs #500, #501, #502, . . . , #589, and #590. The three-dimensional coordinates of the NC program are corrected by using the reference signs #500 to #590 calculated in this correction procedure.

Next, a description will be given regarding a process for correcting the three-dimensional coordinates of the NC program using the correction values described above.

[Correction of Three-Dimensional Coordinates]

First, the unit normal vector V1 at a desired machining point (defined as T1) of the workpiece 5 is calculated based on the CAD data (data illustrating the shape of the workpiece 5 as a finished product) 37 illustrated in FIG. 1, and the NC program created in the CAM 39, that is, the NC program used for machining a workpiece with the tool 3 having an ideal shape.

Figures 5, 6:
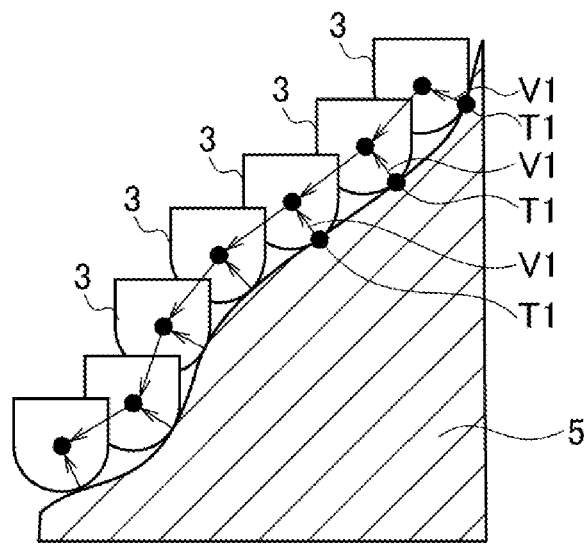
FIG. 5 is an explanatory diagram illustrating the tool moving along a machining path of the workpiece.
FIG. 6 is a diagram illustrating an expression for coordinates of the machining positions using the tool, and illustrating the coordinates of the machining positions which have not been corrected yet caused by contour errors.

FIG. 5 is an explanatory diagram illustrating the tool 3 moving according to the machining path when the workpiece 5 is machined by the tool 3. As illustrated in FIG. 5, when the workpiece 5 is machined by the tool 3, a point where the tool 3 comes into contact with the workpiece 5 becomes the machining point T1 of the workpiece 5. The unit normal vector (defined as V1) at the machining point T1 is calculated.

This process is performed by the calculation unit 33$a$ of the computer 33 (refer to FIG. 1), for example. The three-dimensional coordinates of the machining point T1 can be acquired from the NC program, or by actually moving an ideal tool (ball end mill) according to the machining path when this ideal tool is mounted.

Further, when the workpiece 5 is machined by the tool 3, the tool 3 moves in at least one of the X-axis, Y-axis, and Z-axis directions with respect to the workpiece 5. That is, the three-dimensional position of the machining point T1 changes as the machining proceeds.

The surface of the workpiece 5 centered on the machining point T1 is a flat surface or a curved surface. However, when the surface is limited to an extremely minute region, this region can be regarded as a plane even if it is a curved surface.

The unit normal vector V1 is a vector orthogonal to the above-described minute region (plane) and has a component in each direction of the X-axis, the Y-axis, and the Z-axis. The scalar quantity of the unit normal vector V1 is naturally "1". In other words, when the respective numerical values constituting the components in the X-axis, Y-axis, and Z-axis directions of the unit normal vector V1 are squared and added, and the square root (root) of the resultant value is calculated, this solution is "1".

In the first embodiment, the correction values (the differences between the ideal contour line P1 and the actual contour line P3) stored as the above reference signs #500, #501, . . . , #589, and #590 are set as deviation amounts in the respective angular directions. Thereafter, the unit normal vector V1 is vectorially decomposed into the components in the three-dimensional directions of the X-axis, the Y-axis, and the Z-axis, and the deviation amount in each direction is calculated. Hereinafter, a specific description will be given with reference to the arithmetic expressions illustrated in FIGS. 6 and 7.

FIG. 6 illustrates three-dimensional coordinates when the position of machining using the tool 3 moves in the order of the machining points f51, f52, f53, f54, and f55. The three-dimensional coordinates indicate the coordinates when the tool 3 is formed into an ideal shape. That is, FIG. 6 illustrates the three-dimensional coordinates of the machining path initially set in the NC program.

In the first embodiment, the three-dimensional coordinates of the machining path are corrected based on the unit normal vector V1 and the respective reference signs described above. Specifically, the coordinates of the respective machining points f51, f52, f53, f54, and f55 illustrated in FIG. 6 are corrected to the coordinates of the respective machining points f61, f62, f63, f64, and f65 illustrated in FIG. 7. That is, the arithmetic expressions illustrated in FIG. 7 are stored in the memory 14, and the coordinates of the machining point T1 are corrected according to the arithmetic expressions.

To be more specific, the three-dimensional coordinates at the machining point f51 illustrated in FIG. 6 are X=−1.60657, Y=−0.42583, and Z=−1.09809, for example. On the other hand, the coordinates when the actual contour line P3 is deviated from the ideal contour line P1 are corrected to the machining point f61 illustrated in FIG. 7. The machining points f51 and f61 have an angle of 64 degrees using the tool 3 illustrated in FIG. 4. Accordingly, the correction value stored as the reference sign #564 is read from the memory 14, and the correction value is decomposed into each direction of the X-axis, the Y-axis, and the Z-axis based on the unit normal vector described above, thereby calculating the correction value in each axial direction. Thereafter, the three-dimensional coordinates of the machining point f51 before correction are corrected according to this correction value, and thus the three-dimensional coordinates of the machining point f61 illustrated in FIG. 7 are calculated.

Hereinafter, the arithmetic expression for the machining point f61 illustrated in FIG. 7 will be described in more detail. (X, Y, Z)=(−0.89101, 0.11528, −0.4391) is acquired by decomposing the unit normal vector V1 at the machining point f61 into the components of the X-axis, the Y-axis, and the Z-axis, for example. Further, since the angle of the machining point is 64 degrees, the correction value stored as the reference sign #564 is employed.

Figure 7:
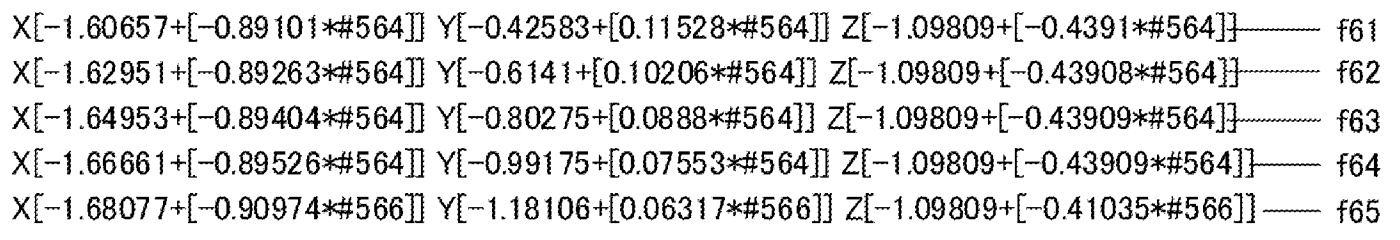

That is, [−0.89101×#564], which is a correction value for the X coordinate illustrated in "f61" of FIG. 7, is a numerical value obtained by multiplying the correction value set as the reference sign #564 by "−0.89101", which is a component in the X-axis direction of the unit normal vector V1. In addition, [0.11528×#564], which is a correction value for the Y coordinate, is a numerical value obtained by multiplying the correction value set as the reference sign #564 by "0.11528", which is a component in the Y-axis direction of the unit normal vector V1. In addition, [−0.4391×#564], which is a correction value for the Z coordinate, is a numerical value obtained by multiplying the correction value set as the reference sign #564 by "−0.4391", which is a component in the Z-axis direction of the unit normal vector V1.

Accordingly, the three-dimensional coordinates illustrated at the machining point f61 in FIG. 7 are coordinates reflecting the correction values based on a contour error. The influence of a contour error can be avoided to perform machining with high accuracy by operating the tool 3 based on coordinates even when a contour error occurs between the ideal contour line P1 and the actual contour line P3. That is, the three-dimensional coordinates of the machining point f51 illustrated in FIG. 6 are corrected to the three-dimensional coordinates of the machining point f61 illustrated in FIG. 7, thereby making it possible to perform machining of the workpiece 5 by bringing a desired portion of the tool 3 into contact with the machining point of the workpiece 5.

[Description of Amount of Avoidance]

When the contour error described above is corrected, there may be a case where the tool 3 comes into contact with a point (contact point) different from the machining point of the workpiece 5, and the tool 3 bites into the workpiece 5 at this contact point to machine the workpiece 5. In this case, it is necessary to avoid contact between the tool 3 and this contact point. Hereinafter, a description will be given in detail with reference to FIGS. 8A to 8D, and FIGS. 9A and 9B.

Figure 8A:
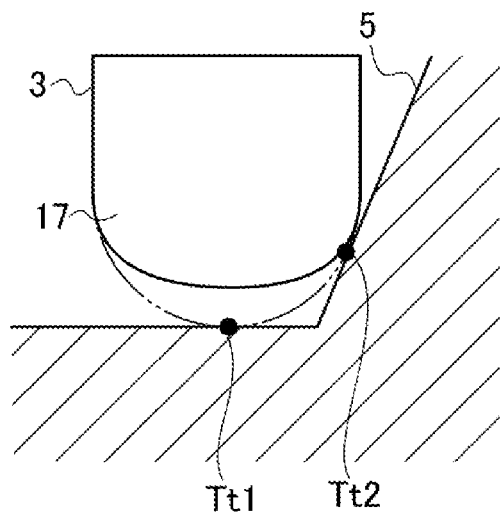

The two-dot chain line in FIG. 8A indicates a contour line of the tool 3 having an ideal shape without a contour error. The solid line in FIG. 8A indicates a contour line of the tool 3 having a contour error.

In a case where the machining point Tt1 illustrated in FIG. 8A is machined by the tool 3, if there is no contour error, that is, if the tool 3 has an ideal shape, the tool 3 comes into contact with the machining point Tt1 and performs machining of the workpiece 5. However, when a contour error occurs as illustrated by the solid line in FIG. 8A, a machining position using the tool 3 is corrected according to the correction value described above.

Figure 8B:
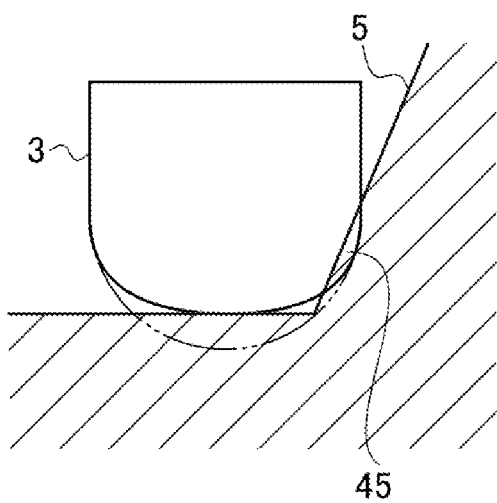

For this reason, the lower end of the tool 3 having the contour error is corrected so as to be in contact with the machining point as illustrated in FIG. 8B. As a result, the tool 3 comes into contact at the contact point Tt2 on the slope of the workpiece 5, and the bite 45 occurs. When the machining of the workpiece 5 is performed in this state, the workpiece 5 is excessively cut.

Figure 8C:
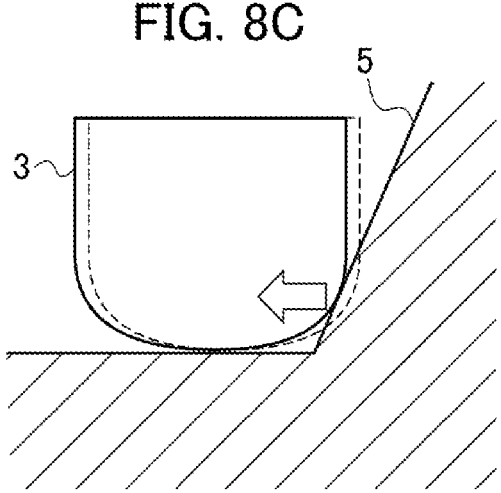
Figure 8D:
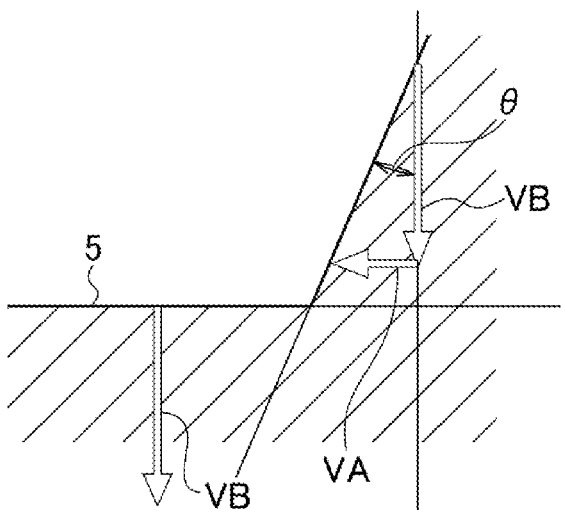

In the first embodiment, the position of the tool 3 is corrected as illustrated in FIG. 8C in order to avoid unnecessary machining due to this interference. Specifically, as illustrated in FIG. 8D, the vector VA, which exists on a plane defined by a unit normal vector between the machining point Tt1 and the contact point Tt2 and is orthogonal to the unit normal vector VB of the machining point Tt1, is calculated, and the vector VA is defined as an avoidance vector. The machining position using the tool 3 is corrected according to the avoidance vector VA to avoid the bite 45 into the contact point Tt2.

That is, the bite 45 can be avoided by making a correction for shifting by the amount of avoidance VA in the direction orthogonal to the normal line of the machining point Tt1. The amount of avoidance VA can be calculated by the "amount of correction (of the machining point Tt1) VB×tan θ". "θ" is an intersection angle between the normal line of the machining point Tt1 and the plane in contact with the contact point Tt2 (the plane including the machining point Tt1 and perpendicular to the normal line of the contact point Tt2).

More specifically, the coordinates of the tool 3 in the X-axis direction, the Y-axis direction, and the Z-axis direction are expressed by the sum of the values illustrated in the expressions (1) and (2) of FIG. 9A.

The coordinate value in the X-axis direction of the tool 3 is expressed by the coordinate value (arithmetic expression) fill in FIG. 9B. A numeral "0.123" in the coordinate value f111 is a coordinate value in the X-axis direction of the tool 3 before correction (when there is no correction for the contour error).

In the coordinate value f111, the reference sign "#513" indicated by the "amount of correction at the machining point Tt1" is a correction value for the contour error (scalar amount) at the machining point Tt1 of the tool 3, as described with reference to FIG. 4. A numeral "0.216" in the coordinate value f111 is the X-axis direction component of the unit normal vector at the machining point Tt1.

In the coordinate value f111, the reference sign "#513" indicated by the "amount of avoidance at the machining point Tt1" is a correction value for the contour error (scalar amount) at the machining point Tt1 of the tool 3, as described with reference to FIG. 4. A numeral "−0.816" in the coordinate value f111 is the X-direction component of the avoidance vector (unit vector) at the machining point Tt1. A numeral "0.613" in the coordinate value f111 is a value of the tan θ described above. The same applies to the components in the Y-axis direction and the Z-axis direction.

When the coordinate value f111 described above is generalized, the following expression (1) is obtained.

$$X \text{ coordinate} = Px + (i1 \times \#50A + i11 \times \#50A \times \tan \theta)$$

$$Y \text{ coordinate} = Py + \times (j1 \times \#50A + j11 \times \#50A \times \tan \theta)$$

$$Z \text{ coordinate} = Pz + (k1 \times \#50A + k11 \times \#50A \times \tan \theta) \quad (1)$$

[Operation when Machining Point Transitions from One-Point Machining to Two-Point Machining]

When the tool (ball end mill) 3 performs machining in the vicinity of the joint of two machining surfaces, for example, the machining point may transition from one-point machining to two-point machining.

Figure 10A:
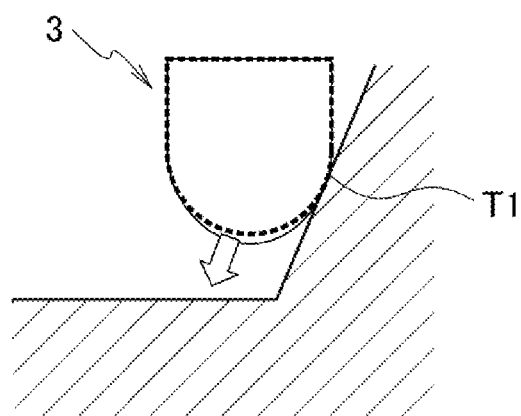
FIGS. 10A to 10C are explanatory diagrams illustrating the machining points of the workpiece when a contour error occurs in the tool.
Figure 10B:
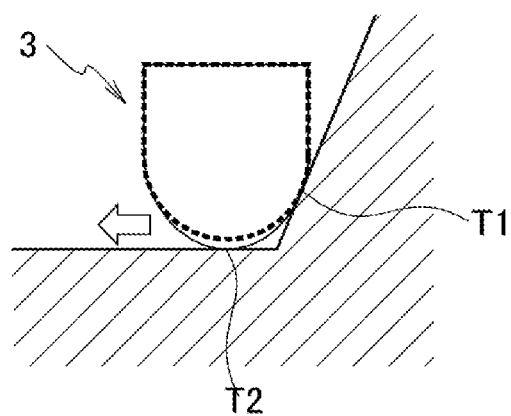
Figure 10C:
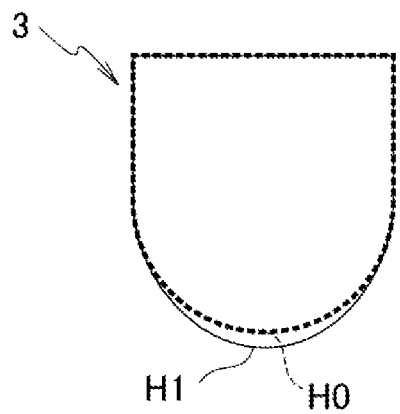

FIGS. 10A to 10C are explanatory diagrams illustrating the operation of the tool 3 when the first machining point T1 of the workpiece 5 is machined by the tool 3, and thereafter the process transitions to machining the second machining point T2. FIG. 10A illustrates a state in which the tool 3 machines the first machining point T1, and FIG. 10B illustrates a state in which the tool 3 machines both the first machining point T1 and the second machining point T2, that is, a state in which two-point machining is performed.

When machining using the NC program is performed in a case where a contour error is generated in the tool 3 and the actual contour line H1 (solid line) protrudes with respect to the ideal contour line H0 (broken line) as illustrated in FIG. 10C, the tool 3 comes into contact with the second machining point T2 when one-point machining including only the first machining point T1 is performed, that is, at a point before transitioning to two-point machining, and thus the tool 3 bites into the workpiece 5.

Figure 11A:
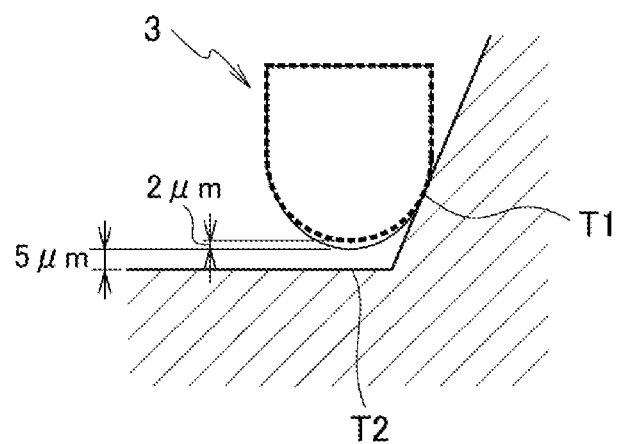
FIGS. 11A and 11B are explanatory diagrams illustrating the machining positions using the tool when the actual contour line of the tool protrudes beyond the ideal contour line of the tool.
Figure 11B:
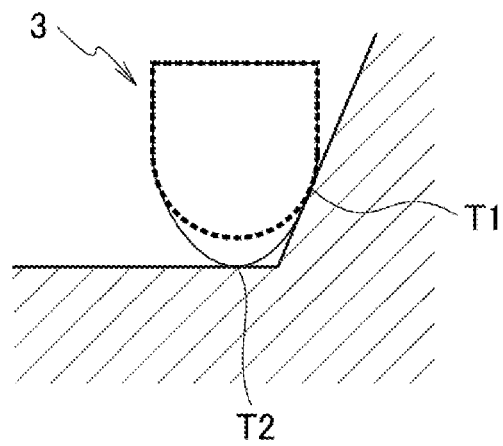

For example, in the NC program, in a case where the distance between the tip of the tool 3 and the second machining point T2 is 7 μm, and when the error of the tip of the tool 3 is 2 μm (when the tool 3 has a protrusion of 2 μm), the distance between the tool 3 and the second machining point T2 is 5 μm as illustrated in FIG. 11A. Further, when the error of the tip of the tool 3 exceeds 7 μm, the tip of the tool 3 comes into contact with the workpiece 5, and the bite occurs as illustrated in FIG. 11B.

Accordingly, when the machining point machined by the tool 3 transitions from one-point machining including the first machining point T1 to two-point machining including the first machining point T1 and the second machining point T2, it is necessary to correct the position of the tool 3 in consideration of the tool 3 approaching the second machining point T2.

In the first embodiment, the first machining point T1 is machined by the tool 3, and thereafter when the tool 3 transitions to two-point machining including the first machining point T1 and the second machining point T2, a correction value is calculated according to a distance (approaching distance) between the tool 3 and the second machining point T2. Specifically, a coefficient that changes in accordance with the distance between the tool 3 and the second machining point T2 (this coefficient is defined as a "first distance effect coefficient Ed") is set, and the machining position of the tool 3 is corrected in accordance with the first distance effect coefficient Ed. The first distance effect coefficient Ed is a numerical value of 0 to 1.

[Description of First Distance Effect Coefficient Ed]

Figure 12:
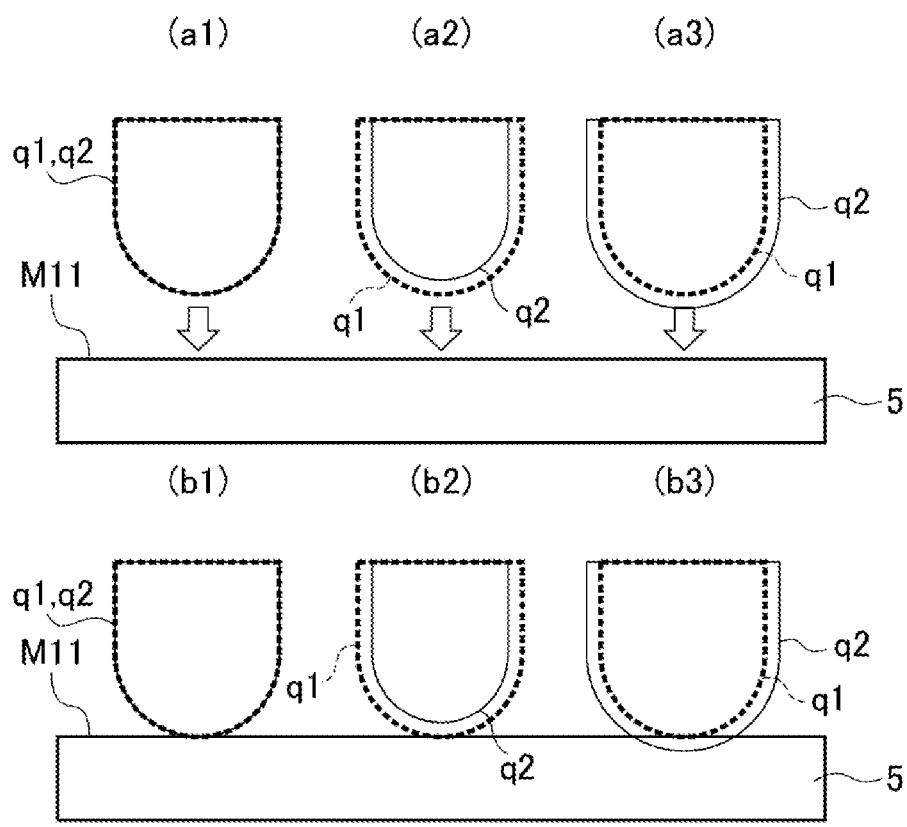
FIG. 12 is an explanatory diagram illustrating a machining state when the actual contour line of the tool and the ideal contour line of the tool coincide with each other, a machining state when the actual contour line is smaller than the ideal contour line, and a machining state when the actual contour line is greater than the ideal contour line.

Next, a description will be given regarding the first distance effect coefficient Ed. FIG. 12 is an explanatory diagram illustrating machining of the workpiece 5 using the ideal contour line q1 (broken line) and the actual contour line q2 (solid line) of the tool 3. (a1) of FIG. 12 illustrates the case where the ideal contour line q1 and the actual contour line q2 coincide with each other, (a2) of FIG. 12 illustrates the case where the actual contour line q2 is smaller than the ideal contour line q1 (e.g. smaller by 5 μm), and (a3) of FIG. 12 illustrates the case where the actual contour line q2 is greater than the ideal contour line q1 (e.g. greater by 5 μm).

Thereafter, when the workpiece machining surface M11 is machined by the tool 3 having the actual contour line q2 of the shapes illustrated in (a1) to (a3) of FIG. 12, the results illustrated in (b1) to (b3) of FIG. 12 are obtained. Specifically, as illustrated in (a1) of FIG. 12, when the ideal contour line q1 and the actual contour line q2 coincide with each other, the tool 3 is in contact with the machining point on the machining surface M11 as illustrated in (b1) of FIG. 12. However, as illustrated in (a2) of FIG. 12, when the actual contour line q2 is smaller than the ideal contour line q1, the tool 3 does not reach the machining point on the machining surface M11 as illustrated in (b2) of FIG. 12. Further, as illustrated in (a3) of FIG. 12, when the actual contour line q2 is greater than the ideal contour line q1, the tool 3 bites inward from the machining point of the machining surface M11 as illustrated in (b3) of FIG. 12.

Figure 13:
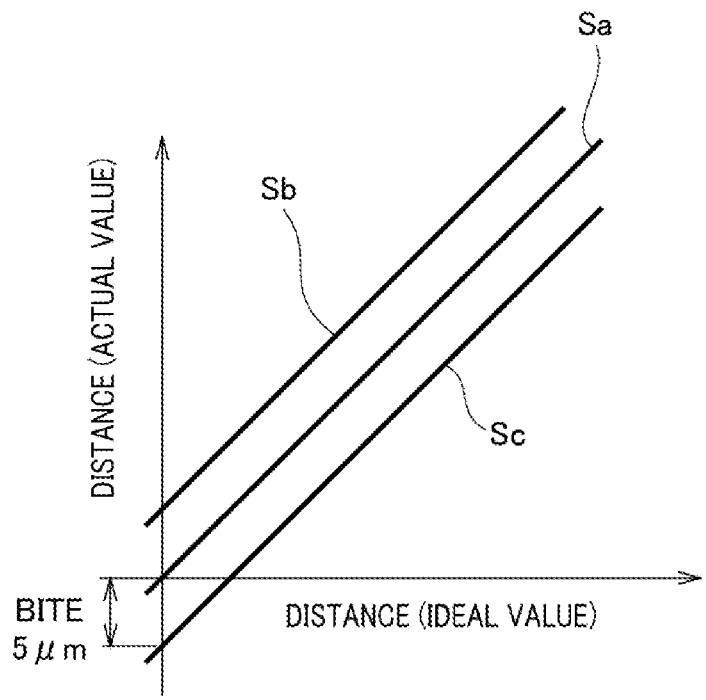
FIG. 13 is a graph illustrating the relationship between an ideal value and an actual value in the distance between the tool and the workpiece, wherein Sa indicates that the actual contour line and the ideal contour line coincide with each other, Sb indicates that the actual contour line is smaller than the ideal contour line, and Sc indicates that the actual contour line is greater than the ideal contour line.

FIG. 13 is a graph illustrating the relationship between the distance between the tool 3 and the workpiece 5 (the machining surface M11) at this time. In FIG. 13, the horizontal axis represents the ideal values of the distances between the tool 3 and the workpiece 5, and the vertical axis represents the actual distances (actual values) between the tool 3 and the workpiece 5. The graph line Sa illustrates the case where the tool 3 has an ideal contour line as illustrated in (a1) of FIG. 12, the graph line Sb illustrates the case where the actual contour line of the tool 3 is smaller as illustrated in (a2) of FIG. 12, and the graph line Sc illustrates the case where the actual contour line of the tool 3 is greater as illustrated in (a3) of FIG. 12.

Figure 14:
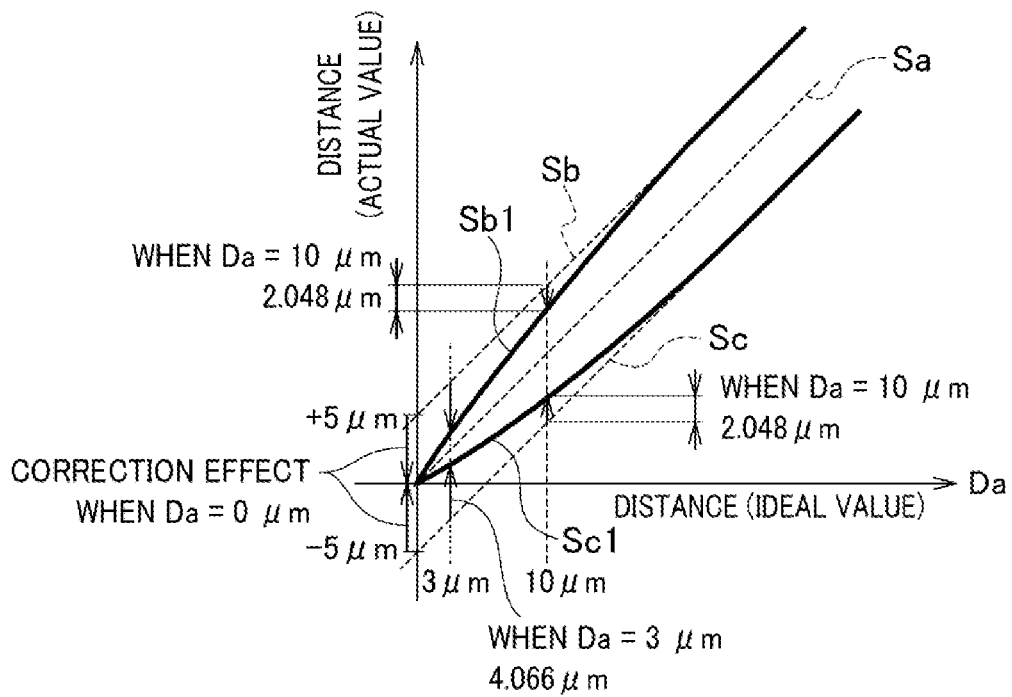
FIG. 14 is a graph in which the graph lines Sa, Sb and Sc illustrated in FIG. 13 are corrected using distance effect coefficients.

When a correction is made such that the graph lines Sb and Sc are close to the graph line Sa, the contour error of the tool 3 with respect to the machining surface M11 can be corrected. In the first embodiment, as illustrated in FIG. 14, the contour error is gradually reduced in accordance with the distance between the tool 3 and the machining surface M11, and the first distance effect coefficient Ed for setting the contour error to 0 is set when the distance between the tool 3 and the machining surface M11 becomes 0. Thereafter, the correction value is changed so as to result in the graph lines Sb1 and Sc1 of FIG. 14 by multiplying the contour error (correction value) by the first distance effect coefficient Ed.

At this time, in order to generate the graph lines Sb1 and Sc1 from the graph lines Sb and Sc, the first distance effect coefficient Ed is calculated based on the following expression (2).

$$Ed = 1.25 \exp(-10^6 \cdot Da^3 - 300 \cdot Da) \quad (2)$$

In Expression (2), "Da" indicates a distance between the ideal-shaped tool 3 and the machining surface M11, and "exp" indicates an exponential function. Note that the arithmetic expression illustrated in (2) is an example, and it is also possible to calculate the first distance effect coefficient Ed by another arithmetic expression.

Figure 15:
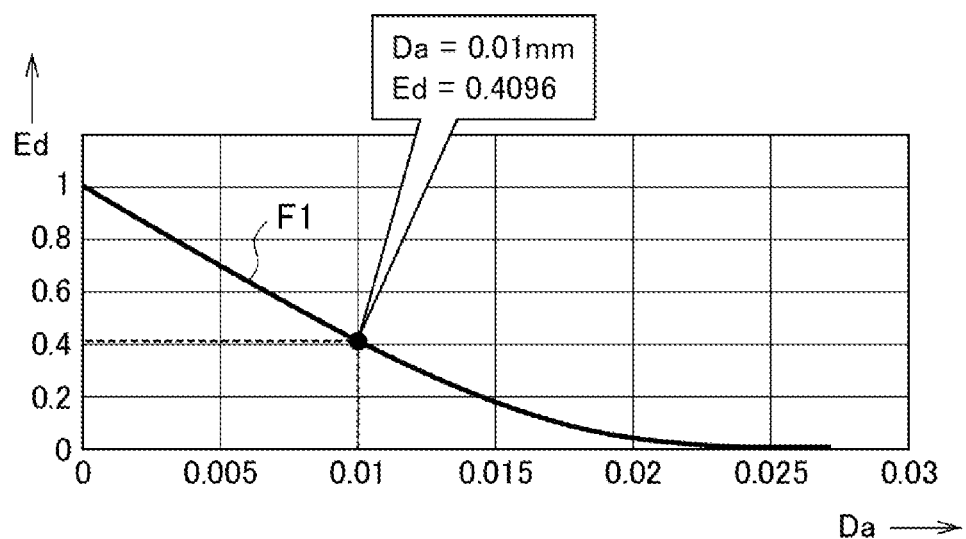
FIG. 15 is a graph illustrating the relationship between the distance Da from the machining point, and a distance effect coefficient Ed.

When Expression (2) is illustrated as a graph, a graph line like the graph line F1 illustrated in FIG. 15 is obtained. In FIG. 15, the horizontal axis indicates the distance Da between the tool 3 in an ideal state and the workpiece 5, and the vertical axis indicates the first distance effect coefficient Ed. As understood from the graph line F1, the first distance effect coefficient Ed is a coefficient that changes in the range of "0 to 1", and the rate of change (inclination of the graph line) increases as the distance between the tool 3 and the workpiece 5 decreases.

In consideration of the first distance effect coefficient Ed, even when an error is generated between the tool 3 and the machining surface M11 of the workpiece 5, the correction value is gradually changed according to the approaching distance therebetween, so that the tool 3 comes into contact with the machining surface M11, thereby making it possible to avoid a sudden change in the correction value for the tool 3 when the machining point machined by the tool 3 transitions from the one-point machining to the two-point machining.

More specifically, when the machining surface M11 of the workpiece 5 is machined by the tool 3, "+0.005" is stored in the reference sign #50A based on the contour error of the tool 3 measured in advance in a case where the tool 3 has a diameter smaller than the ideal value by 5 μm, for example. Further, "−0.005" is stored in the reference sign #50A in a case where the tool 3 has a diameter greater than the ideal value by 5 μm. Note that "#50A" is an angle (0 to 90 degrees) of the machining point T1 when the machining point T2 comes in contact with the machining surface M11, among #500 to #590 described above. For example, 1 degree means "#501".

Referring to the graph line F1 illustrated in FIG. 15, when Da=0, that is, when the tool 3 comes in contact with the machining point T2 to machine the workpiece 5, "Ed=1" is obtained. Accordingly, when the tool 3 is greater than the ideal value by 5 μm, the correction value is −5 μm.

When Da=10 μm, "Ed=0.4096" is obtained, and when the tool 3 is greater than the ideal value by 5 μm, the correction value is −2.048 μm (refer to FIG. 14).

When Da=3 μm, "Ed=0.81314" is obtained, and when the tool 3 is greater than the ideal value by 5 μm, the correction value is −4.066 μm refer to FIG. 14).

In particular, when Da=3 μm described above and when the tool 3 is 5 μm greater than the ideal value, "3−5=−2" is obtained if there is no correction, resulting in the bite of 2 μm. However, since the correction of −4.066 μm is made by multiplying the first distance effect coefficient Ed, the bite can be avoided.

Figure 16:
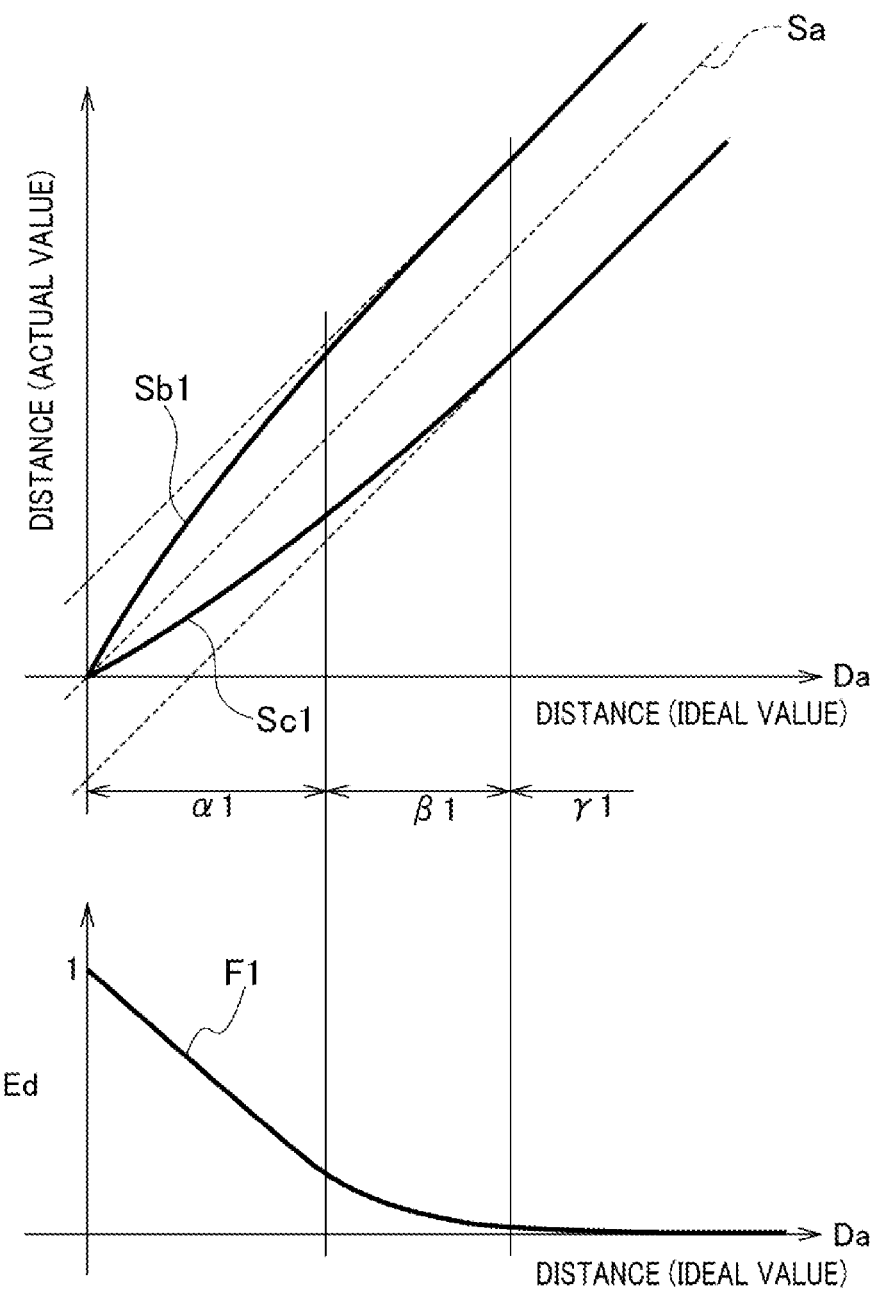
FIG. 16 is a graph in which the graph lines illustrated in FIG. 14 and FIG. 15 are compared with each other.

The first distance effect coefficient Ed is preferably set such that the inclination becomes greater as the distance from the tool 3 becomes closer to 0. Specifically, as illustrated in FIG. 16, the inclination is set so as to be small in the region γ1 which is far from the tool 3 to the workpiece 5 in distance, the inclination is set so as to gradually increase in the intermediate region β1, and the inclination is set to greatly change in the region α1 which is close to the machining point from the tool 3 in distance. That is, as the tool 3 becomes closer to the second machining point T2 from a predetermined distance, the increase rate of the first distance effect coefficient Ed gradually increases, thereby making it possible to gradually increase the influence of the first distance effect coefficient Ed.

[Calculation of Coordinates when Transitioning from One-Point Machining to Two-Point Machining]

Figure 17:
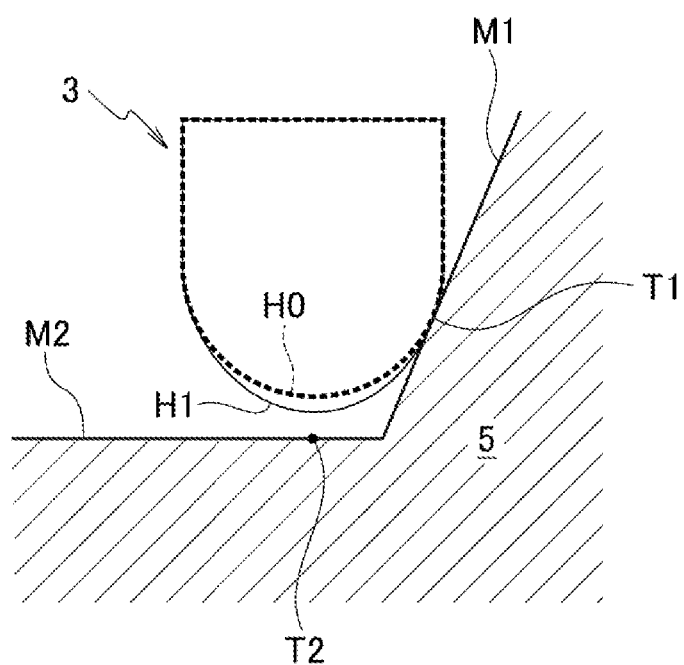
FIG. 17 is an explanatory diagram illustrating the positional relationship between the tool and the workpiece when the machining point machined by the tool transitions from a first machining surface M1 to a second machining surface M2.

Next, a description will be given regarding the correction of the coordinates of the tool 3 when the machining point of the workpiece 5 machined by the tool 3 transitions from one point to two points. As illustrated in FIG. 17, the correction of the X, Y and Z coordinates of the tool 3 will be described when the tool 3 approaches the second machining point T2 from the state where the first machining point T1 of the workpiece 5 is machined by the tool 3.

The unit normal vector of the first machining point T1 on the first machining surface M1 illustrated in FIG. 17 is set to (i1, j1, k1) and the amount of correction of the first machining point T1 is set to #50B. "#50B" is an angle (0 to 90 degrees) corresponding to the first machining point T1 among #500 to #590 described above. That is, "#50B" is an angle of a straight line based on the center line C1. The straight line connects the point of the tool 3 when the tool 3 is in contact with the first machining point T1, and the center C2 illustrated in FIG. 4.

The unit normal vector of the second machining point T2 on the second machining surface M2 is set to (i2, j2, k2) and the amount of correction of the second machining point T2 is set to #50A. Similarly, "#50A" is a numerical value of the angle (0 to 90 degrees) corresponding to the second machining point T2 among #500 to #590.

Further, the avoidance vector of the first machining point T1 is set to (i11, j11, k11), and the intersection angle between the normal line of the first machining point T1 and the plane in contact with the second machining point T2 is set to "0" (see FIG. 8). In addition, the avoidance vector of the second machining point T2 is set to (i22, j22, k22).

Thereafter, the corrected X, Y, and Z coordinates are calculated as illustrated in Expression (3) in FIG. 18. In FIG. 18, Px, Py, and Pz represent ideal values of the three-dimensional coordinates. In FIG. 18, a reference "r1" illustrated in the first term inside the brackets indicates the amount of correction of the first machining point T1. A reference "r2" illustrated in the second term indicates the amount of correction of the second machining point T2. A reference "r3" illustrated in the third term indicates the amount of avoidance (the first amount of avoidance) of the first machining point T1. A reference "r4" illustrated in the fourth term indicates the amount of avoidance (the second amount of avoidance) of the second machining point T2.

For example, in the case where the distance when the tool 3 approaches the second machining point T2 is 10 μm, "the first distance effect coefficient Ed=0.4096" is obtained as illustrated in FIG. 15. Accordingly, Expression (3) illustrated in FIG. 18 becomes Expression (4) as illustrated in FIG. 19.

As described above, when the machining point machined by the tool 3 transitions from one-point machining including the first machining point T1 to two-point machining including the first machining point T1 and the second machining point T2, the first distance effect coefficient Ed changes according to the distance when the tool 3 approaches the second machining point T2, as illustrated by the graph line F1 of FIG. 15. Accordingly, when the machining point machined by the tool 3 transitions from the one-point machining to the two-point machining, it is possible to avoid the occurrence of a rapid position fluctuation of the tool 3 due to the correction. Thus, the workpiece 5 can be stably machined by the tool 3.

[Description of Correction Procedures of NC Program]

Figure 20:
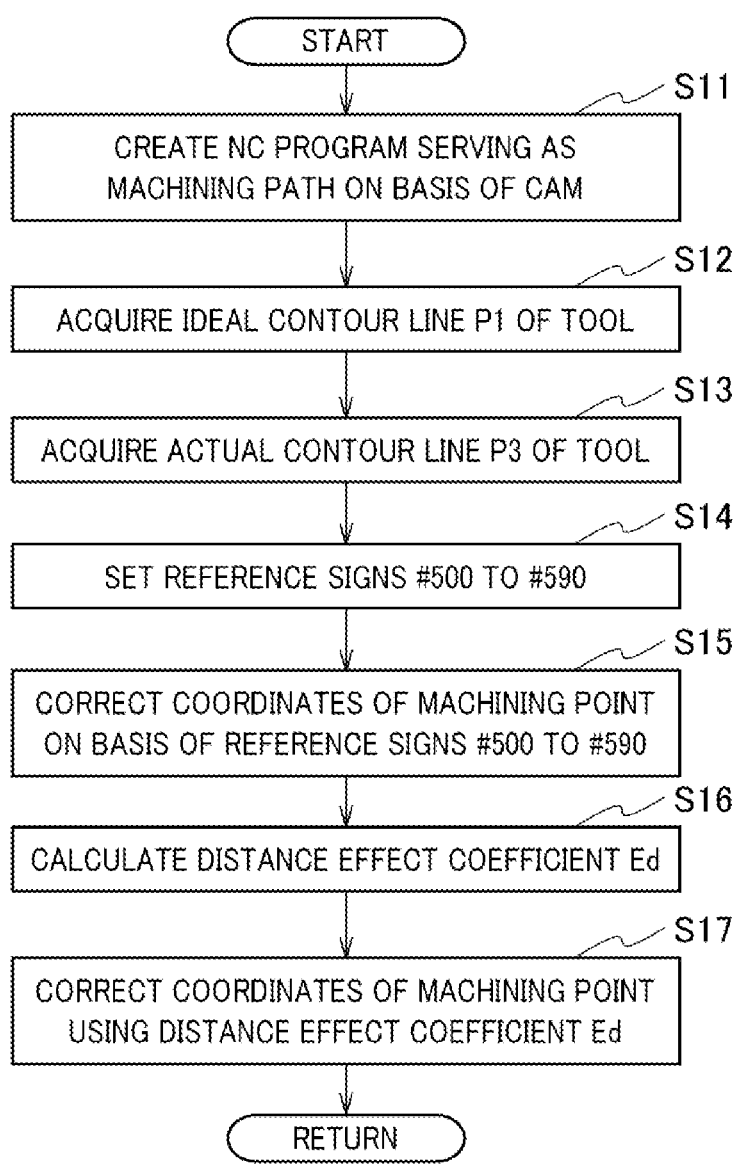
FIG. 20 is a flowchart illustrating the processing procedures for correcting an NC program of the workpiece machining device according to a first embodiment.

Next, a description will be given regarding the correction procedures for the machining point machined by the workpiece machining device 1 according to the first embodiment with reference to the flowchart illustrated in FIG. 20. The procedures illustrated in FIG. 20 are executed by the control unit 13 and the calculation unit 33a of the computer 33 as illustrated in FIG. 1. The following procedures are stored in the computer 33 as a computer program.

First, in step S11 illustrated in FIG. 20, the NC program serving as a machining path of the tool 3 is created by the CAM 39 illustrated in FIG. 1. The machining path at this time is a machining path when the tool 3 is accurately mounted on the spindle 29 of the tool holding unit 9 and there is no shape error in the tool 3.

In step S12, the positional deviation detection unit 131 of the control unit 13 calculates the ideal contour line P1 of the tool 3. The ideal contour line P1 can be read from the dimensions of an ideal tool stored in the memory 14.

In step S13, the positional deviation detection unit 131 acquires the actual contour line P3 of the tool 3. Specifically, since the contour line P2 can be calculated by radiating a laser beam from the side-surface direction of the tool 3 with a laser measuring instrument (tool shape measuring device 31 illustrated in FIG. 1) and detecting the laser beam making contact with the tool 3, the actual contour line P3 is calculated based on the contour line P2 (refer to FIGS. 3A and 3B).

In step S14, the positional deviation detection unit 131 calculates correction values for each angular direction of the arc-shaped portion of the tool 3 based on the ideal contour line P1 and the actual contour line P3, and sets the calculated correction values to the reference signs #500 to #590 (refer to FIG. 4).

In step S15, the positional deviation correction unit 331 of the calculation unit 33a calculates the unit normal vector V1 at the first machining point T1 of the workpiece 5, and further corrects the coordinates of the machining point in the X-axis direction, Y-axis direction, and Z-axis direction using the correction values stored in the reference signs #500 to #590. Specifically, the correction value set to the reference sign #564 is acquired based on the angle (0 to 90 degrees) of the machining position where the tool 3 is in contact with the first machining point T1, for example. Further, the unit normal vector V1 is decomposed into the components in the X-axis direction, the Y-axis direction, and the Z-axis direction, and the coordinates of the machining point in the X-axis direction, the Y-axis direction, and the Z-axis direction are corrected by multiplying the above correction value.

In step S16, the distance effect coefficient calculation unit 332 of the calculation unit 33a calculates the first distance effect coefficient Ed according to the distance between the tool 3 and the second machining point T2. Specifically, the first distance effect coefficient Ed (a numerical value of 0 to 1), which becomes greater as the distance to the second machining point T2 decreases, is calculated based on the graph line F1 illustrated in FIG. 15.

In step S17, the positional deviation correction unit 331 of the calculation unit 33a corrects the coordinates of the machining position using the tool 3 by using the first distance effect coefficient Ed. Specifically, the X, Y, and Z coordinates of the machining position using the tool 3 are corrected based on Expression (3) illustrated in FIG. 18. Thereafter, the procedures end.

Thus, when a machining point machined by the tool 3 transitions from one-point machining to two-point machining, the coordinate values of the NC program can be corrected to the appropriate values by setting the correction value according to the distance between the tool 3 and the second machining point T2. Thus, the workpiece machining device 1 is controlled using the corrected NC program, thereby making it possible to stably machine the workpiece 5.

Description of Effect of First Embodiment

As described above, the workpiece 5 is machined using the tool 3 (ball end mill) in the workpiece machining device 1 according to the first embodiment. When the machining point machined by the tool 3 transitions from the one-point machining including the first machining point T1 to the two-point machining including the first machining point T1 and the second machining point T2, the first distance effect coefficient Ed is calculated according to the distance when the tool 3 approaches the second machining point T2. The workpiece machining device 1 changes the correction value at the second machining point T2 according to the first distance effect coefficient Ed.

Accordingly, when the tool 3 approaches the second machining point T2, the machining position using the tool 3 is corrected in consideration of the correction value according to the second machining point T2. Thus, it is possible to avoid the occurrence of problems such as the tool 3 not reaching the second machining point T2 or the tool 3 biting into the workpiece 5 at the second machining point T2 when the machining point machined by the tool 3 transitions from the one-point machining to the two-point machining.

Further, the workpiece machining device 1 according to the first embodiment makes it possible to avoid sudden contact with the second machining point T2 when the machining point machined by the tool 3 transitions from the one-point processing to the two-point processing, thereby making it possible to realize the stable machining of the workpiece 5.

In the workpiece machining device 1 according to the first embodiment, the arithmetic expression for the corrected processing path is stored in the memory 14 as illustrated in FIG. 18, and the reference signs #500 to #590 are substituted into the arithmetic expression to correct the three-dimensional coordinates. Thus, it is possible to reduce the calculation load at the time of machining, thereby making it possible to shorten the time required for machining the workpiece 5.

Figure 21:
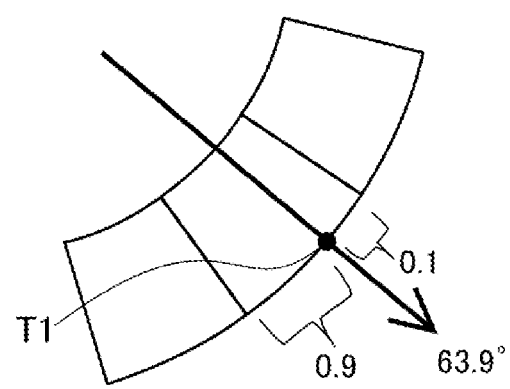
FIG. 21 is an explanatory diagram illustrating a state when a contour error of the tool is set in units smaller than 1 degree.

In the first embodiment, a description has been given regarding an example in which the correction value for each 1 degree of the arc-shaped portion of the tool 3 is calculated within a range of 0 to 90 degrees. In addition, in a case where an angle is 63.9 degrees as illustrated in FIG. 21, the correction value may be obtained by proportionally distributing the reference sign #563 of 63 degrees and the reference sign #564 of 64 degrees, which are close to the angle of 63.9 degrees, at a ratio of 1 to 9. The employment of such a method makes it possible to perform correction processing of the machining point with higher accuracy.

Description of Second Embodiment

Next, a second embodiment will be described. In the first embodiment, a description has been given regarding the correction for performing two-point machining including the first machining point T1 on the first machining surface M1 and the second machining point T2 on the second machining surface M2 present in the workpiece 5. In the second embodiment, a description will be given regarding three-point machining.

Figure 22A:
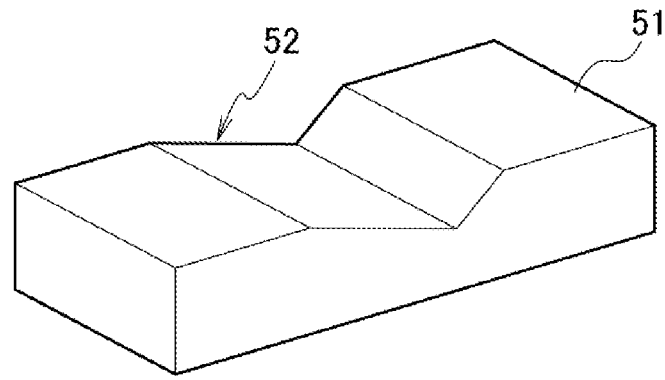
FIGS. 22A to 22C are explanatory diagrams illustrating machining surfaces for performing three-point machining of three surfaces present in the workpiece.
Figure 22B:
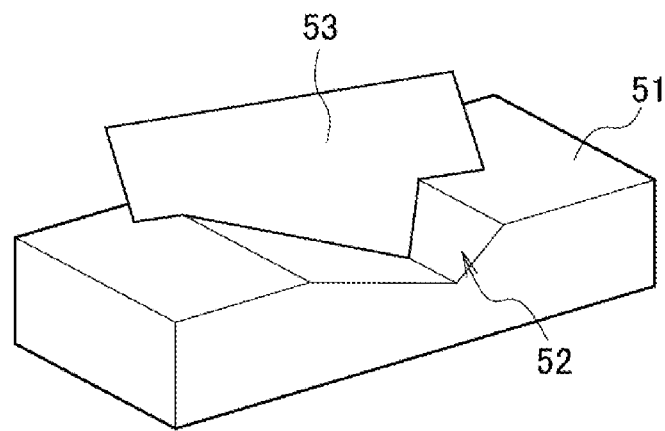
Figure 22C:
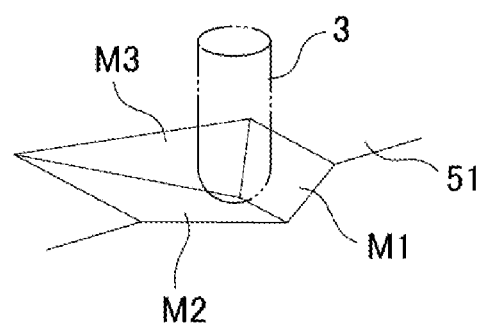

FIGS. 22A to 22C are explanatory diagrams illustrating a structure of the workpiece machining surface in three-point machining. A shape is assumed in which an uneven V-shaped cut portion 52 is formed in a rectangular parallelepiped workpiece 51 as illustrated in FIG. 22A, and a flat plate 53 is inserted into the cut portion 52 of the workpiece 51 from an oblique direction as illustrated in FIG. 22B. Thereafter, the three surfaces surrounded by the cut portion 52 and the flat plate 53 are respectively defined as a first machining surface M1, a second machining surface M2, and a third machining surface M3 as illustrated in FIG. 22C. In the second embodiment, a correction value for the tool 3 is set when the machining point machined by the tool 3 transitions from the two-point machining including the machining point on the first machining surface M1 and the machining point on the second machining surface M2 to the three-point machining including a machining point (third machining point) on the third machining surface M3. A detailed description of this will be given below.

Figure 23A:
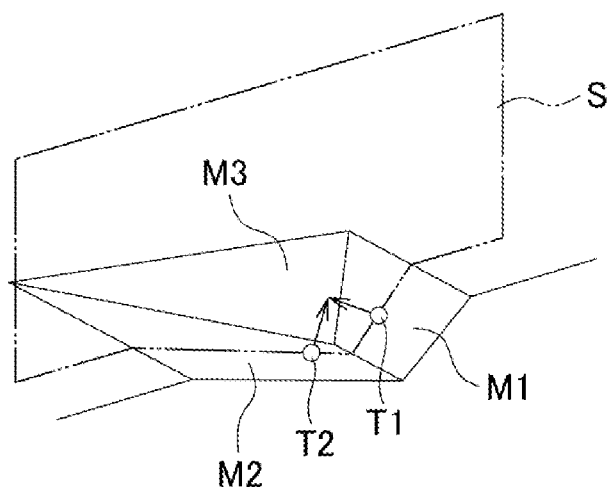
FIG. 23A is an explanatory diagram illustrating a plane S including a normal line of the first machining surface and a normal line of the second machining surface among the three planes illustrated in FIG. 22C.

First, assuming the two-point machining including the first machining surface M1 and the second machining surface M2, the machining position of the tool 3 is corrected by employing the method in the first embodiment. Next, a plane S (a predetermined plane) is defined which passes through machining points or approach points of the first machining surface M1 and the second machining surface M2 and which is specified by the unit normal vector of the machining points of the respective machining surfaces M1 and M2. At this time, not only the unit normal vector of the machining points of the first machining surface M1 and the second machining surface M2, but an avoidance vector of the machining points or the approach points is also placed on the plane S as illustrated in FIG. 23A.

Figure 23B:
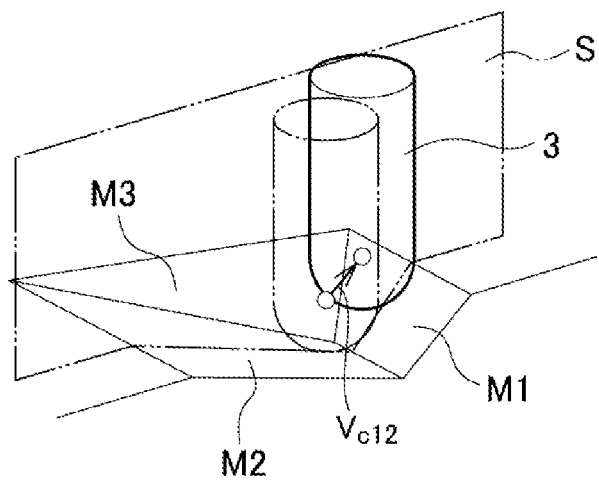
FIG. 23B is an explanatory diagram illustrating a state in which the tool is corrected according to a motion vector on the plane S.

That is, all vectors used for correcting the machining points of the first machining surface M1 and the second machining surface M2 are present on the plane S. That is, a correction vector for correcting the first machining point T1 and a correction vector for correcting the second machining point T2 are present on the plane S. Accordingly, in the process for correcting the machining positions on the first machining surface M1 and the second machining surface M2, a motion vector (referred to as "motion vector Vc12") for combining all the correction operations and correcting the final machining position is also present on the plane S, regardless of irregularities of a contour error of the tool 3, as illustrated in FIG. 23B.

Next, the machining of the third machining surface M3 using the tool 3 is taken into consideration. In this case, it is necessary to correct (A) and (B) described below.

(A) Correction in the normal line direction of the third machining surface M3 which has been carried out conventionally.

(B) To avoid biting into or insufficient cutting in the third machining surface M3 caused by correction operations for the first machining surface M1 and the second machining surface M2.

Figure 24A:
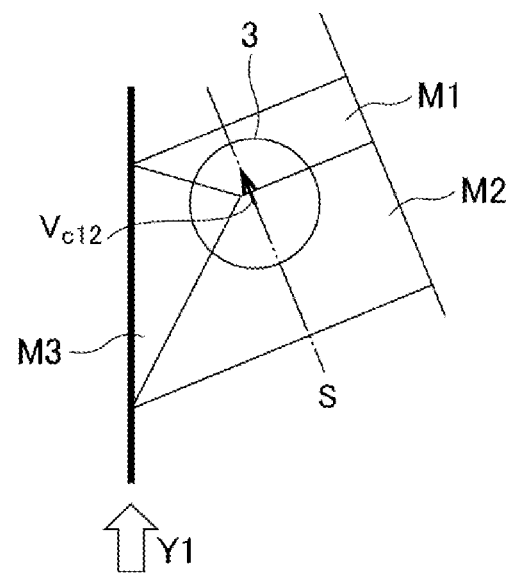
FIGS. 24A and 24B are explanatory diagrams illustrating the separation between the tool and the third machining surface when the tool is corrected according to the motion vector.
Figure 24B:
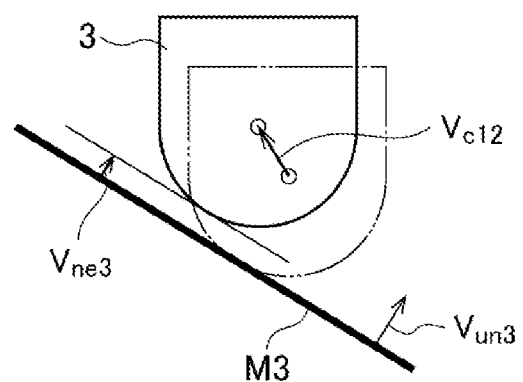

FIG. 24A is a zenith view of the first to the third machining surfaces M1 to M3 as viewed in the axial direction of the tool 3. The vector Vc12 illustrated in FIG. 24A illustrates the "motion vector Vc12" illustrated in FIG. 23B. The motion vector Vc12 is placed along the plane S. FIG. 24B illustrates a diagram in which an arbitrary direction Y1 is set to the third machining surface M3 illustrated in FIG. 24A, viewed from the normal line direction of the plane passing through the direction Y1 in the vertical direction. As illustrated in FIG. 24B, when the tool 3 moves along the motion vector Vc12, a deviation vector Vne3, which is oriented in the normal line direction of the third machining surface M3, is generated between the tool 3 and the third machining surface M3.

In a case where the unit normal vector of the third machining surface M3 is Vun3, the deviation vector Vne3 can be calculated by an inner product of the motion vector Vc12 and the unit normal vector Vun3. That is, the deviation vector Vne3 can be calculated by "Vne3=Vc12·Vun 3". Here, "·" indicates an inner product of the vectors. Further, the direction of the deviation vector Vne3 is the same as the direction of the unit normal vector Vun3.

Figure 25:
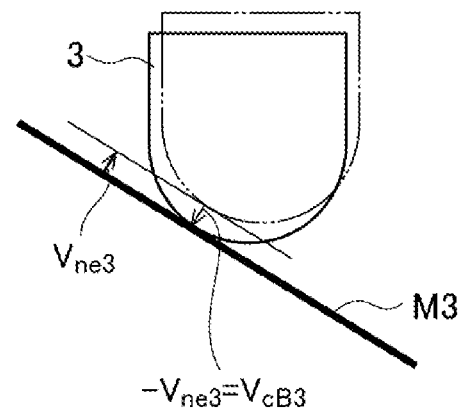
FIG. 25 is an explanatory diagram illustrating the vector for correcting the separation illustrated in FIG. 24B.

When the tool 3 is in contact with the third machining surface M3 in an ideal state (a state where a motion vector Vc12 is 0), the influence of the correction made between the first machining surface M1 and the second machining surface M2 can be eliminated by moving the deviation vector Vne3 in the opposite direction as it is. That is, a vector VcB3, which is the opposite direction of the deviation vector Vne3, is set as illustrated in FIG. 25.

Figure 26A:
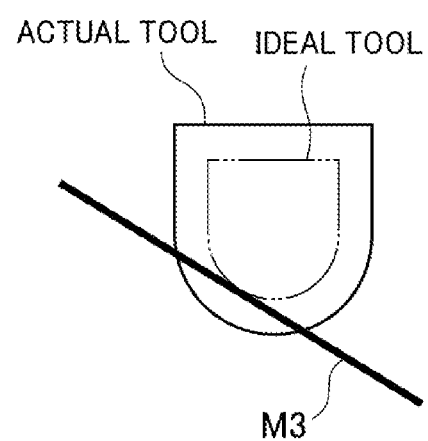
FIGS. 26A and 26B are explanatory diagrams illustrating a correction vector VcA3 when the tool bites into the third machining surface due to a contour error of the tool.
Figure 26B:
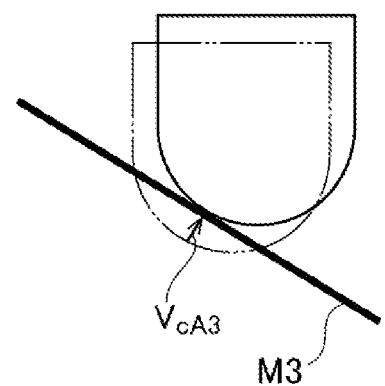

Next, the correction described in (A) is made. More specifically, when the tool 3 approaches or bites into the third machining surface M3, the correction value for moving the tool 3 in the normal line direction of the third machining surface M3 is calculated in the same manner as the correction described in the first embodiment. This vector is defined as VcA3. For example, when the tool 3 is to bite into the third machining surface M3 as illustrated in FIG. 26A, the bite can be avoided by moving the tool 3 by the amount of the vector VcA3 as illustrated in FIG. 26B.

Thereafter, a vector Vc3 obtained by combining the vector VcB3 and the vector VcA3 is calculated, which results in (vector Vc3)=(vector VcA3)+(vector VcB3). The combined vector Vc3 is a correction vector necessary for machining the third machining surface M3.

Since the correction caused by the contour error of the tool 3 has been completed between the first machining surface M1 and the second machining surface M2, there is a concern that the correction will be rendered ineffective if a new correction is added to the machining position of the tool 3. However, the final motion vector between the first machining surface M1 and the second machining surface M2, that is, the motion vector Vc12 illustrated in FIG. 23B, is a vector on the plane S as described above. Accordingly, the motion vector Vc12 is not affected as long as the tool 3 moves in the direction perpendicular to the plane S (the normal line direction of the plane S). Thus, the correction between the first machining surface M1 and the second machining surface M2 is not affected.

Figure 27A:
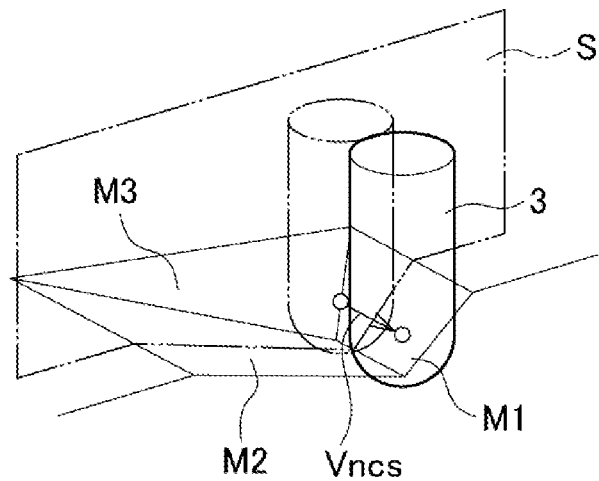
FIGS. 27A and 27B are explanatory diagrams illustrating a method of calculating a correction vector perpendicular to the plane S.
Figure 27B:
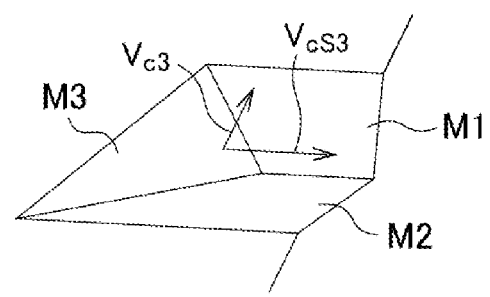

This is, it is sufficient if the vector Vc3 (the combined vector of VcB3 and VcA3) can be converted into a vector in the normal line direction of the plane S as illustrated in FIGS. 27A and 27B. This vector in the normal line direction is defined as "VcS3".

Both the directions of the vector Vc3 and the vector VcS3 can be obtained from the CAD data, and can be calculated in advance. Accordingly, the magnitude of the vector VcS3 may be obtained from the magnitude of the vector Vc3 (including positive and negative signs).

Figure 28A:
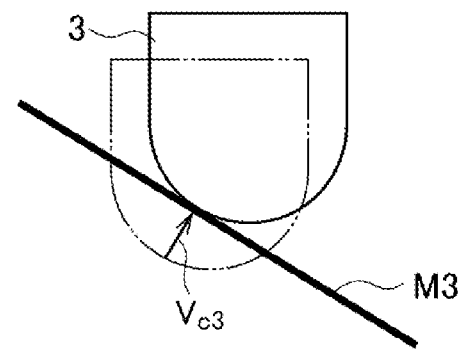
FIGS. 28A to 28C are explanatory diagrams illustrating a correction when the tool bites into the third machining surface.
Figure 28B:
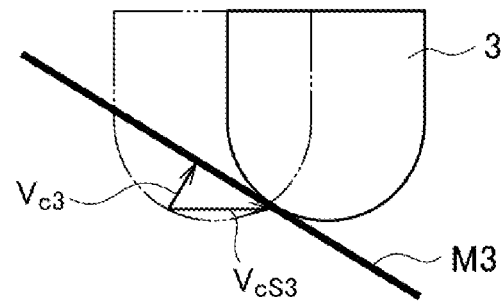
Figure 28C:
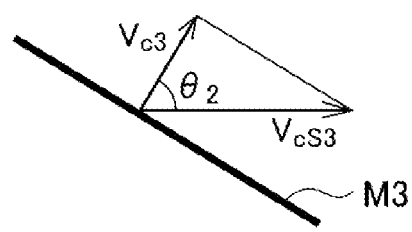

As illustrated in FIGS. 28A to 28C, when the angle formed by the vector Vc3 and the vector VcS3 is θ2, the following expression (5) is obtained.

$$|VcS3| \times \cos\theta2 = |Vc3|$$

That is, $|VcS3| = |Vc3|/\cos\theta2$ (5)

The magnitude of the vector VcS3 (including the sign) is determined, and the direction of the vector VcS3 is obtained from the CAD data. Thus, the vector VcS3 is finally determined.

Accordingly, it is possible to obtain a correction vector in consideration of corrections for all of the first machining surface M1, the second machining surface M2, and the third machining surface M3, that is, "the vector Vc12+vector VcS3".

Since the vector Vc12 is already obtained in the first embodiment, a procedure for calculating the "vector VcS3" will be described below in detail.

When the tool 3 machines the workpiece 5 by means of two-point contact including the first machining surface M1 and the second machining surface M2, the X, Y, and Z coordinates are corrected according to Expression (3) illustrated in FIG. 18. When the X-axis component of the vector Vc12 is Vc12x, the Y-axis component of the vector Vc12 is Vc12y, and the Z-axis component of the vector Vc12 is Vc12z, Expression (3) illustrated in FIG. 18 becomes the following expression (6):

$$X[Px+Vc12x]$$

$$Y[Py+Vc12y]$$

$$Z[Pz+Vc12z] \quad (6)$$

When the workpiece 5 is machined by means of three-point contact including the three machining surfaces M1, M2, and M3, the above vector VcS3 is added. When the X-axis component of the vector VcS3 is VcS3x, the Y-axis component of the vector VcS3 is VcS3y, and the Z-axis component of the vector VcS3 is VcS3z, the X, Y, and Z coordinates are given by the following expression (7):

$$X[Px+Vc12x+VcS3x]$$

$$Y[Py+Vc12y+VcS3y]$$

$$Z[Pz+Vc12z+VcS3z] \quad (7)$$

Accordingly, when Expression (7) can be programmed into the NC program, it is possible to perform three-point contact machining using the tool 3.

First, a second distance effect coefficient Ed3, which is a coefficient that changes according to the distance between the tool 3 and the third machining surface M3, is calculated. The calculation method of the second distance effect coefficient Ed3 is the same as the calculation method of the first distance effect coefficient Ed described above, and the second distance effect coefficient Ed3 is a variable that changes within a range of "0 to 1". In addition, when the tool 3 comes into contact with the third machining surface M3, "Ed3=1" is obtained.

After the second distance effect coefficient Ed3 is calculated, the normal line direction illustrated in (A) is corrected. Specifically, the correction vector for the third machining surface M3 of the tool 3 is calculated. The X, Y and Z components of this correction vector are VcAx, VcAy and VcAz, respectively. Further, when the X, Y, and Z components of the unit normal vector at the machining point of the third machining surface M3 are i3, j3, and k3, respectively, and when the reference sign according to the angle at which the tool 3 comes into contact with the third machining surface M3 is #50D, the correction vector described above can be calculated by the following expression (8):

$$VcA3x = i3 \times \#50D \times Ed3$$

$$VcA3y = j3 \times \#50D \times Ed3$$

$$VcA3z = k3 \times \#50D \times Ed3 \quad (8)$$

Next, a description will be given regarding a process for avoiding biting into or insufficient cutting in the third machining surface M3 caused by the correction operation of the first machining surface M1 and the second machining surface M2 illustrated in (B) above.

As illustrated in FIG. 23, the sign of the inner product (this will be referred to as "IPS3c12") of the final motion vector Vc12 of the first machining surface M1 and the second machining surface M2 and the unit normal vector of the third machining surface M3 is reversed to obtain a correction vector for avoiding biting into or insufficient cuffing in the third machining surface M3. In a case where this correction vector is "VcB3", the X, Y, and Z components of the vector VcB3, that is, VcB3x, VcB3y, and VcB3z, can be calculated by Expression (9) illustrated in FIG. 29. In Expression (9), "IPS3c12=i3×Vc12x+j3×Vc12y+k3×Vc12z" is obtained.

Expressions (8) and (9) are combined to calculate the correction vector Vc3 (Vc3x, Vc3y, Vc3z) of the tool 3 with respect to the third machining surface M3. That is, the correction vector Vc3 is calculated using the following expression (10).

$$Vc3x = VcA3x + VcB3x$$

$$Vc3y = VcA3y + VcB3y$$

$$Vc3z = VcA3z + VcB3z \quad (10)$$

Next, the correction vector Vc3 is converted into the vector in the normal line direction of the plane S, and this vector is defined as the vector VcS3.

At this time, the unit normal vector (that is, the direction of the vector VcS3) of the plane S is obtained in advance. However, as for the magnitude |VcS3| of the vector VcS3, the calculation for obtaining "|Vc3</cos θ2" must be described as the NC program. In particular, the magnitude of the vector (scalar) can be calculated by calculating the square root of the sum of the squares of the respective X, Y, and Z components. However, this calculation is too long to fit in one line of the NC program.

In consideration of the above circumstances, when the inner product of the vector VcS3 and the unit normal vector (i3, j3, k3) is calculated, "cos (0 degrees)=1" is obtained. Accordingly, the scalar can be calculated. Further, the sign (sign(VcS3)) of the vector VcS3 is not lost. Thus, the following expression (11) is obtained.

$$|Vc3| \times \text{sign}(VcS3) = Vc3x \times i3 + Vc3y \times j3 + Vc3z \times k3 \quad (11)$$

In a case where the unit normal vector of the plane S is set to i4, j4, k4 and the angle formed by the third machining surface M3 and the plane S is set to θ2, when the final correction vector Vc3 of the third machining surface M3 is expanded, Expression (12) illustrated in FIG. 30 is obtained. Here, i4, j4, and k4 are oriented in a direction close to the normal line of the third machining surface M3, that is, in a direction in which the inner product of the normal line of the third machining surface M3 becomes positive.

As understood from Expression (12) illustrated in FIG. 30, the term of "Vc3$x$×i3+Vc3$y$×j3+Vc3$z$×k3" is common regardless of the X, Y, and Z axes. When this term is expanded, Expression (13) illustrated in FIG. 31 is obtained.

Further, when "IPS3c12" illustrated in Expression (13) is expanded, it becomes Expression (14) illustrated in FIG. 32.

Accordingly, the vector VcS3 is expanded according to Expressions (12) to (14) illustrated in FIGS. 30 to 32. The terms included in these expressions include the unit normal vector, the avoidance vector, the first distance effect coefficient, the second distance effect coefficient, and the trigonometric function, in the machining points of the respective surfaces. The terms also include the reference signs #50A, #50C, and #50D, which are determined at the time of machining, and these reference signs are known values. Accordingly, the final "motion vector VcS3" of the tool 3 can be calculated. Specifically, when Expression (7) is expanded based on Expressions (3) and (12) described above, Expressions (15) to (18) illustrated in FIG. 33 are obtained.

Further, referring to Expressions (15) and (18), it is possible to summarize these expressions into Expression (19) illustrated in FIG. 34. In Expression (19), Px, a, (3, and y are all real numbers. Accordingly, the calculation load using the NC program does not increase at the time of machining.

Thus, the machining position of the tool 3 is corrected using the motion vector VcS3, thereby making it possible to perform stable machining considering a contour error of the tool 3 in a case where the tool 3 is in contact with three surfaces of the workpiece 5 to perform machining.

Description of Effect of Second Embodiment

Thus, when the machining point machined by the tool 3 transitions from two-point machining including the first machining surface M1 and the second machining surface M2 in the workpiece 5 to three-point machining including the third machining surface M3, the machining device according to the second embodiment avoids interference between the tool 3 and the third machining surface M3 by calculating a vector in the normal line direction with respect to the plane S and correcting this vector.

Further, in a case where the distance between the tool 3 (end mill) and the third machining point approaches within a predetermined distance when the machining point machined by the tool 3 transitions from the two-point machining to the three-point machining, the positional deviation is corrected based on the correction value at the first machining point, the correction value at the second machining point, the correction value at the third machining point, the first distance effect coefficient, and the second distance effect coefficient.

Accordingly, when the machining point machined by the tool 3 transitions from the two-point machining including the first machining surface M1 and the second machining surface M2 to the three-point machining including the third machining surface M3, it becomes possible for the tool 3 to avoid biting into or insufficient cutting in the third machining surface M3. As a result, the workpiece 5 can be machined with high accuracy even in the three-point machining.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A machining method for machining a workpiece into a desired shape, comprising:
    detecting a positional deviation between an actual contour line and an ideal contour line when an end mill having a hemispherical lower end and rotating about a rotation axis to perform machining of the workpiece is held by a tool holding unit, the actual contour line being a contour line of the end mill, and the ideal contour line being a contour line of the end mill having an ideal shape;
    calculating a correction value for correcting the positional deviation between the ideal contour line and the actual contour line in each of a plurality of angular directions based on a center of the hemispherical shape;
    calculating a first distance effect coefficient indicating a degree of influence of the positional deviation when machining a second machining point, according to a distance between the end mill and the second machining point in a case where a machining point machined by the end mill transitions from one-point machining including a first machining point on a first machining surface in the workpiece to two-point machining including the first machining point and the second machining point on a second machining surface different from the first machining surface; and
    correcting a positional deviation of the first machining point based on the correction value when performing one-point machining using the end mill, and correcting the positional deviation based on the correction value at the first machining point and the first distance effect coefficient when a distance between the end mill and the second machining point approaches within a predetermined distance in a case where the machining point machined by the end mill transitions from the one-point machining to the two-point machining.

2. The machining method according to claim 1, wherein the first distance effect coefficient is set to become greater as the end mill becomes closer to the second machining point.

3. The machining method according to claim 2, wherein the first distance effect coefficient changes in such a way that an increase rate of the first distance effect coefficient gradually increases as the end mill becomes closer to the second machining point from the predetermined distance.

4. The machining method according to claim 1, further comprising:
    calculating an amount of bite into the second machining surface as a first amount of avoidance when a positional deviation of the first machining point is corrected in a case where the end mill comes in contact with the second machining surface;

calculating an amount of bite into the first machining surface as a second amount of avoidance when a positional deviation of the second machining point is corrected in a case where the end mill comes in contact with the first machining surface; and correcting, in a case where the first machining surface and the second machining surface are machined by the end mill, a positional deviation of the end mill when machining the first machining surface, and a positional deviation of the end mill when machining the second machining surface, based on the first amount of avoidance and the second amount of avoidance.

5. The machining method according to claim 1, wherein when a machining point machined by the end mill transitions from two-point machining including the first machining point on the first machining surface and the second machining point on the second machining surface to three-point machining including the first machining point, the second machining point, and a third machining point on a third machining surface different from the first machining surface and the second machining surface, a predetermined plane, which is a plane including a correction vector configured to correct the first machining point and a correction vector configured to correct the second machining point, is defined, a correction value at the third machining point is calculated in a direction orthogonal to the predetermined plane, and the positional deviation is corrected based on the correction value at the third machining point.

6. The machining method according to claim 1, wherein when the machining point machined by the end mill transitions from the two-point machining including the first machining point on the first machining surface and the second machining point on the second machining surface to the three-point machining including the first machining point, the second machining point, and the third machining point on the third machining surface different from the first machining surface and the second machining surface, the machining method further comprising:

calculating a second distance effect coefficient indicating a degree of influence of the positional deviation when performing the two-point machining, according to a distance between the end mill and the third machining point; and correcting the positional deviation based on the correction value at the first machining point, the correction value at the second machining point, the correction value at the third machining point, and the second distance effect coefficient when a distance between the end mill and the third machining point approaches within a predetermined distance in a case where the machining point machined by the end mill transitions from the two-point machining to the three-point machining.

7. A machining device for machining a workpiece into a desired shape, comprising:

an end mill having a hemispherical lower end and rotating about a rotation axis to perform machining of the workpiece;

a tool holding unit configured to hold the end mill;

a positional deviation detection unit configured to detect a positional deviation between an actual contour line and an ideal contour line when the end mill is held by the tool holding unit, the actual contour line being a contour line of the end mill, and the ideal contour line being a contour line of the end mill having an ideal shape;

a positional deviation correction unit configured to calculate a correction value for correcting the positional deviation between the ideal contour line and the actual contour line in each of a plurality of angular directions based on a center of the hemispherical shape, and correct the positional deviation of the end mill based on the calculated correction value; and a distance effect coefficient calculation unit configured to calculate a first distance effect coefficient indicating a degree of influence of the positional deviation when machining a second machining point, according to a distance between the end mill and the second machining point in a case where a machining point machined by the end mill transitions from one-point machining including a first machining point on a first machining surface in the workpiece to two-point machining including the first machining point and the second machining point on a second machining surface different from the first machining surface; wherein the positional deviation correction unit corrects a positional deviation of the first machining point based on the correction value when performing one-point machining using the end mill, and corrects the positional deviation based on the correction value at the first machining point and the first distance effect coefficient when a distance between the end mill and the second machining point approaches within a predetermined distance in a case where a machining point machined by the end mill transitions from the one-point machining to the two-point machining.

* * * * *